United States Patent
Seo et al.

(10) Patent No.: US 12,539,556 B2
(45) Date of Patent: Feb. 3, 2026

(54) ROTATING TOOL, JOINING DEVICE, AND JOINING METHOD

(71) Applicant: NIPPON LIGHT METAL COMPANY, LTD., Tokyo (JP)

(72) Inventors: Nobushiro Seo, Shizuoka (JP); Shingo Koizumi, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 0 days.

(21) Appl. No.: 18/706,705

(22) PCT Filed: Oct. 4, 2022

(86) PCT No.: PCT/JP2022/037100
§ 371 (c)(1),
(2) Date: May 1, 2024

(87) PCT Pub. No.: WO2023/079890
PCT Pub. Date: May 11, 2023

(65) Prior Publication Data
US 2025/0058405 A1    Feb. 20, 2025

(30) Foreign Application Priority Data
Nov. 5, 2021 (JP) ................................. 2021-181166

(51) Int. Cl.
B23K 20/12        (2006.01)

(52) U.S. Cl.
CPC ........ B23K 20/1255 (2013.01); B23K 20/125 (2013.01)

(58) Field of Classification Search
CPC ................... B23K 20/12; B23K 20/122–1295
USPC ............................. 228/112.1–114.5, 2.1–2.3
See application file for complete search history.

(56) References Cited

U.S. PATENT DOCUMENTS

| | | | | |
|---|---|---|---|---|
| 12,145,211 B2* | 11/2024 | Seo | ..................... | B23K 20/1255 |
| 12,280,442 B2* | 4/2025 | Seo | ..................... | B23K 20/123 |
| 2014/0069985 A1 | 3/2014 | Okada et al. | | |
| 2018/0099349 A1* | 4/2018 | Packer | ............... | B23K 20/1255 |

FOREIGN PATENT DOCUMENTS

| | | | | | |
|---|---|---|---|---|---|
| CA | 3176331 A1 | * | 10/2021 | ........... | B23K 20/127 |
| CN | 106670642 A | * | 5/2017 | | |
| CN | 109048044 A | * | 12/2018 | ......... | B23K 20/1255 |
| CN | 112548315 A | * | 3/2021 | ............. | B23K 20/12 |
| CN | 113226621 A | * | 8/2021 | ........... | B23K 20/122 |
| CN | 114222640 A | * | 3/2022 | | |
| CN | 114589393 A | * | 6/2022 | | |
| DE | 202008001344 U1 | * | 5/2008 | ........... | B23K 20/125 |
| EP | 1872893 A1 | * | 1/2008 | ........... | B23K 20/125 |
| EP | 2596898 A1 | * | 5/2013 | ............. | B23K 20/10 |
| JP | 2000-202647 A | | 7/2000 | | |
| JP | 2003-260572 A | | 9/2003 | | |
| JP | 2004-098172 A | | 4/2004 | | |
| JP | 2004-114138 A | | 4/2004 | | |
| JP | 2006-026731 A | | 2/2006 | | |
| JP | 2012-196681 A | | 10/2012 | | |
| WO | WO-2022118589 A1 | * | 6/2022 | ......... | B23K 20/1225 |
| WO | WO-2022118590 A1 | * | 6/2022 | ........... | B23K 20/125 |
| WO | WO-2022118591 A1 | * | 6/2022 | ......... | B23K 20/123 |
| WO | WO-2023079888 A1 | * | 5/2023 | ............. | B23K 20/12 |
| WO | WO-2023079889 A1 | * | 5/2023 | ............. | B23K 20/12 |
| WO | WO-2023079890 A1 | * | 5/2023 | ............. | B23K 20/12 |

OTHER PUBLICATIONS

International Search Report and Written Opinion for International Patent Application No. PCT/JP2022/037100 (Dec. 27, 2022).

* cited by examiner

*Primary Examiner* — Kiley S Stoner
(74) *Attorney, Agent, or Firm* — Merchant & Gould, P.C.

(57) ABSTRACT

Provided is a rotating tool used in a joining device, the rotating tool including: a main body including a fixation portion and a rotating shaft; a stir member including a stir pin that performs friction stirring on the to-be-joined members, the stir member provided to be rotatable by receiving the rotating force from the rotating shaft and provided in the main body to be movable in an axial direction of the rotating shaft; an elastic member configured to bias the stir member toward a distal end side in the axial direction of the rotating shaft; and a restriction member configured to restrict movement of the stir member toward a based end side in the axial direction of the rotating shaft.

9 Claims, 16 Drawing Sheets

ROTATING TOOL, JOINING DEVICE, AND JOINING METHOD

This application is a National Stage Application of PCT/JP2022/037100, filed Oct. 4, 2022, which claims the benefit of priority to Japanese Patent Application No. 2021-181166, filed Nov. 5, 2021, and which applications are incorporated herein by reference. To the extent appropriate, a claim of priority is made to each of the above disclosed applications.

TECHNICAL FIELD

The present invention relates to a rotating tool, a joining device, and a joining method used in friction stir welding.

BACKGROUND ART

As joining devices for performing friction stir welding, there are known a joining device that performs load control to control a plunging amount of a rotating tool into to-be-joined members and a joining device that performs position control to control the plunging amount. The load control has been mainly used in a joining device achieved by a robot (robot arm), and the position control has been mainly used in a joining device achieved by a machining center (MC).

The joining device that performs the load control includes, for example, a device disclosed in Patent Literature 1. The joining device of Patent Literature 1 is a joining device that controls a press-in depth of a shoulder member or a pin member into to-be-joined objects to obtain good joining quality at preferable accuracy depending on joining conditions. This joining device controls the position of the pin member relative to the shoulder member based on a press-in reference point set in a press-in reference point setter to control the press-in depth. The joining device includes an applied pressure detector, the press-in reference point setter, a tool drive controller, and the like to perform the above-mentioned control. Moreover, a tool driver includes a rotating driver, a pin driver, a shoulder driver, a clamp driver (elastic member: coil spring), and the like.

CITATION LIST

Patent Literature

Patent Literature 1: JP2012-196681A

SUMMARY OF INVENTION

Technical Problem

Since the joining device of Patent Literature 1 performs the load control, the joining device has a complicated structure and is expensive. Accordingly, in recent years, there is a demand for a rotating tool that can perform the load control and that can be fitted to a relatively low-cost MC capable of performing only the position control.

In view of this, an object of the present invention is to provide a rotating tool that can perform the load control in a state where the rotating tool is attached to a machining center, a joining device, and a joining method.

Solution to Problem

The present invention for solving the above problems is a rotating tool used in a joining device configured to perform friction stir welding of to-be-joined members, the rotating tool comprising: a main body including a fixation portion that is attached and fixed to the joining device and a rotating shaft that transmits rotating force from the joining device; a stir member including a stir pin that performs friction stirring on the to-be-joined members by being inserted into the to-be-joined members, the stir member provided to be rotatable by receiving the rotating force from the rotating shaft and provided in the main body to be movable in an axial direction of the rotating shaft; an elastic member configured to bias the stir member toward a distal end side in the axial direction of the rotating shaft; and a restriction member configured to restrict movement of the stir member toward a based end side in the axial direction of the rotating shaft, and the restriction member restricts the movement of the stir member such that an amount of deformation occurring in the elastic member with the movement of the stir member does not exceed a maximum allowable amount of the elastic member.

Moreover, the rotating tool is preferably configured such that the main body further includes a holder that has a hollow tube shape and that is attached to the rotating shaft and a slide shaft that is housed in a center portion of the holder to be slidable in a rotating shaft direction and that rotates in synchronization with the holder, the stir member is provided at a distal end of the slide shaft, the slide shaft is biased toward a distal end side of the stir member via the elastic member, and the restriction member moves the slide shaft toward the base end side in the axial direction of the rotating shaft.

Furthermore, the rotating tool is preferably configured such that the restriction member is provided in the holder, and the movement of the slide shaft is restricted by contact of a base end portion of the slide shaft and a bottom portion of the holder on the base end side with the restriction member that occurs with the movement of the slide shaft.

Moreover, the rotating tool is preferably configured such that the restriction member is provided in a bottom portion of the holder on the base end side, and the movement of the slide shaft is restricted by contact of a base end portion of the slide shaft with the restriction member that occurs with the movement of the slide shaft.

Furthermore, the rotating tool is preferably configured such that the restriction member is provided in a base end portion of the slide shaft, and the movement of the slide shaft is restricted by contact of a bottom portion of the holder on the base end side with the restriction member that occurs with the movement of the slide shaft.

Moreover, the rotating tool is preferably configured such that the restriction member is provided on an outer peripheral surface of the slide shaft, and the movement of the slide shaft is restricted by contact of the restriction member with an intermediate portion of the holder that occurs with the movement of the slide shaft.

Furthermore, the rotating tool is preferably configured such that the restriction member is provided on an outer peripheral surface of the slide shaft, and the movement of the slide shaft is restricted by contact of the restriction member with a distal end portion of the holder that occurs with the movement of the slide shaft.

Moreover, the rotating tool is preferably configured such that the restriction member is provided in a distal end portion of the slide shaft, and the movement of the slide shaft is restricted by contact of the restriction member with a distal end portion of the holder that occurs with the movement of the slide shaft.

Furthermore, the rotating tool is preferably configured such that the stir member is the restriction member, and the movement of the slide shaft is restricted by contact of the stir member with a distal end portion of the holder that occurs with the movement of the slide shaft.

Moreover, the rotating tool is preferably configured such that the stir member further includes a shoulder with a columnar shape or a frustum shape that is coupled to the slide shaft and that has a lower end surface with a flat surface shape or a shape like a mortar, the lower end surface configured to come into contact with the to-be-joined members, and the stir pin hangs down from the lower end surface of the shoulder.

Furthermore, the rotating tool is preferably configured such that the stir member further includes a coupling portion that is coupled to the slide shaft and that has a columnar shape or a frustum shape, and the stir pin hangs down from the lower end surface of the coupling portion.

Moreover, the present invention is a joining device including: the rotating tool; a power unit configured to output the rotating force to be transmitted to the rotating shaft of the rotating tool; and a position controller configured to hold the fixation portion of the rotating tool and perform position control of the rotating tool, and the joining device performs the friction stir welding on the to-be-joined members by causing the position controller to move the rotating tool such that the rotating tool is located at a predetermined height position relative to the to-be-joined members, and insert the stir pin into the to-be-joined members.

Moreover, the joining device is preferably configured such that the rotating tool is the rotating tool according to the claims, and the joining device performs the friction stir welding on the to-be-joined members by inserting the stir pin and the shoulder rotating together with the stir pin into the to-be-joined members.

Furthermore, the joining device is preferably configured such that the rotating tool is the rotating tool according to the claims, and the joining device performs the friction stir welding on the to-be-joined members by inserting only the rotating stir pin into the to-be-joined members in a state where the coupling portion is separated from the to-be-joined members.

Furthermore, the present invention includes performing friction stir welding on the to-be-joined members by moving the rotating tool such that the rotating tool is located at a predetermined height position relative to the to-be-joined members, and inserting the stir pin into the to-be-joined members.

Advantageous Effects of Invention

According to the rotating tool, the joining device, and the joining method in the present invention, load control using the elastic member can be performed. Moreover, according to the rotating tool, the joining device, and the joining method in the present invention, it is possible to insert the stir pin also into a relatively-hard to-be-joined members while using the elastic member.

DESCRIPTION OF EMBODIMENTS

Embodiments of the present invention are explained with reference to the drawings as appropriate. The present invention is not limited only to the following embodiments. Moreover, some or all of components in the embodiments can be combined as appropriate. Furthermore, the drawings are drawings for conceptually explaining the present invention, and dimensions of shown components and ratios of the dimensions may vary from actual dimensions and ratios.

1. First Embodiment 1-1. Rotating Tool

Figure 1:
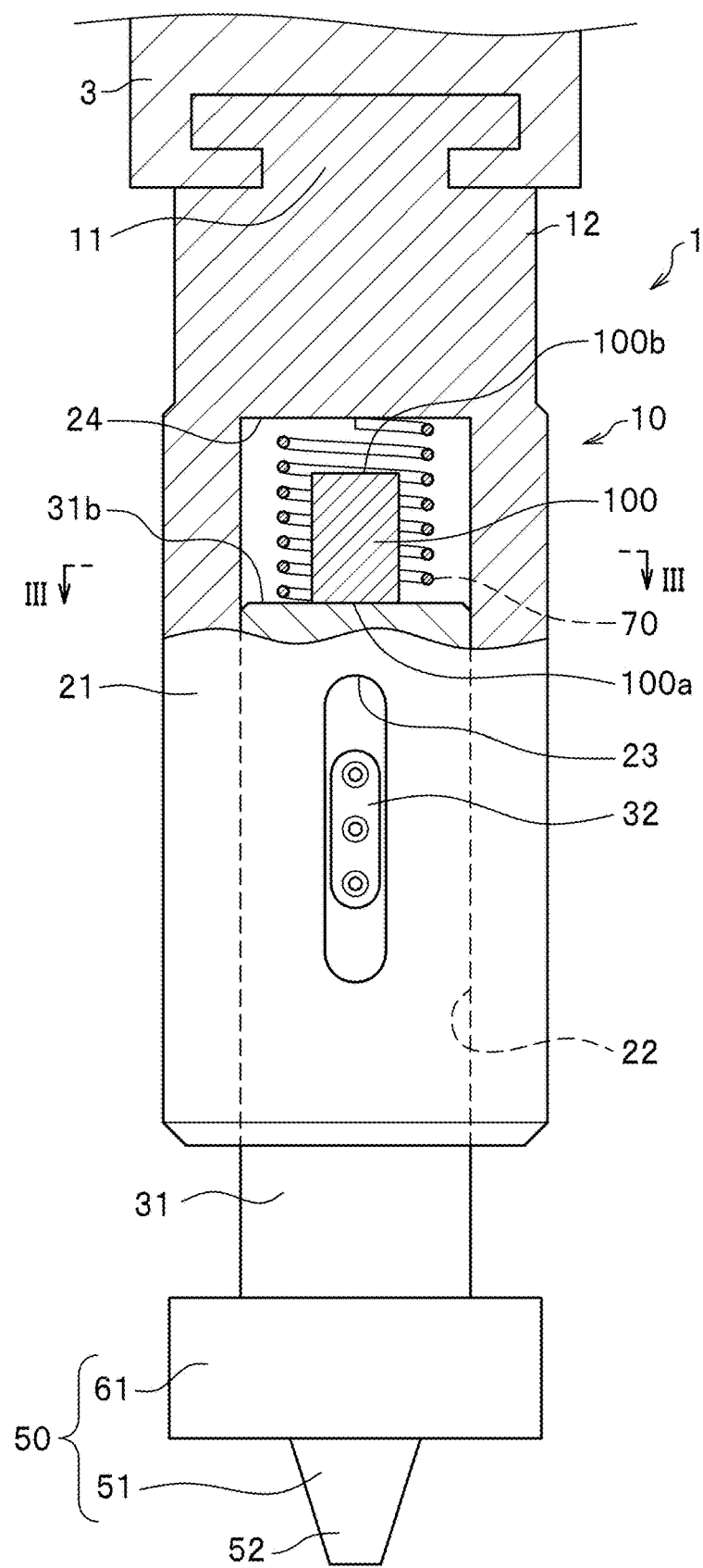
FIG. 1 is a partial cross-sectional side view showing a rotating tool according to a first embodiment of the present invention.
Figure 2:
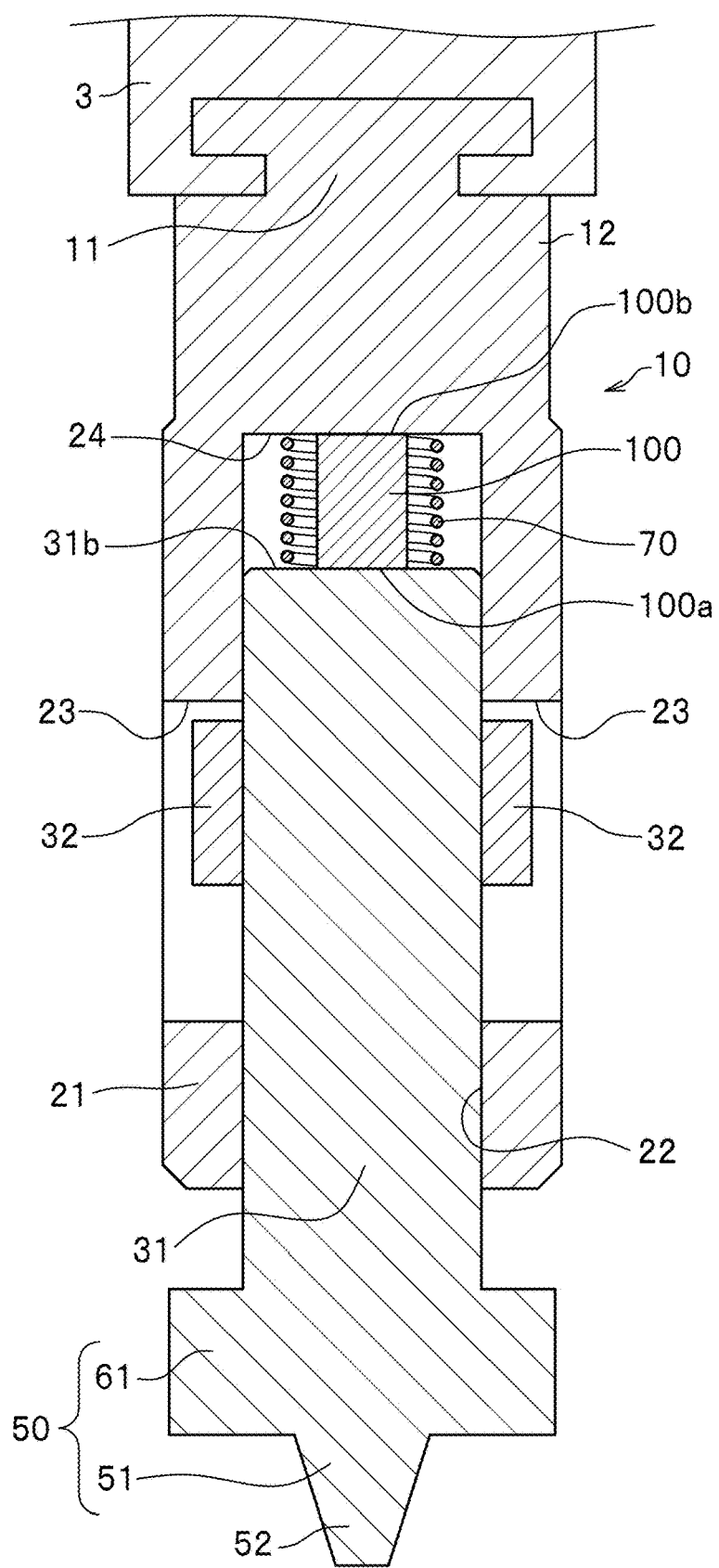
FIG. 2 is a vertical cross-sectional view showing a most-contracted state of the rotating tool according to the first embodiment.

First, a configuration of a rotating tool according to a first embodiment is explained. As shown in FIGS. 1 and 2, the rotating tool 1 according to the present embodiment is a tool used in a joining device 3 that performs friction stir welding of to-be-joined members 2 (see FIG. 6), and is inserted into a butt portion of the to-be-joined members 2 while being rotated. The rotating tool 1 as described above includes a main body 10, a stir member 50, an elastic member 70, and a restriction member 100.

<Main Body>

The main body 10 is a portion fixed to the joining device 3 such as, for example, a machining center, and includes a fixation portion 11 and a rotating shaft 12. The fixation portion 11 is portion configured to be attached and fixed to the joining device 3, and has a cylindrical shape. The fixation portion 11 is a chuck mechanism, and can be detachably fixed to the joining device 3 by working in cooperation with a chuck mechanism that is provided in the joining device 3 and that forms a pair with the fixation portion 11. Examples of the chuck mechanisms include a groove provided in the fixation portion 11 and a claw provided in the joining device 3 and configured to clamp the fixation portion 11 by being fitted to the groove on the fixation portion 11 side. The rotating shaft 12 is provided by being coupled to an end side (lower side in FIG. 1) of the fixation portion 11 other than the side where the fixation portion 11 is attached to the joining device 3. The rotating shaft 12 has a cylindrical column shape. The rotating shaft 12 is a portion that transmits rotating force from the joining device 3 to the stir member 50, and is coupled to a rotating shaft (not shown) of the joining device 3 via the fixation portion 11.

Figure 3:
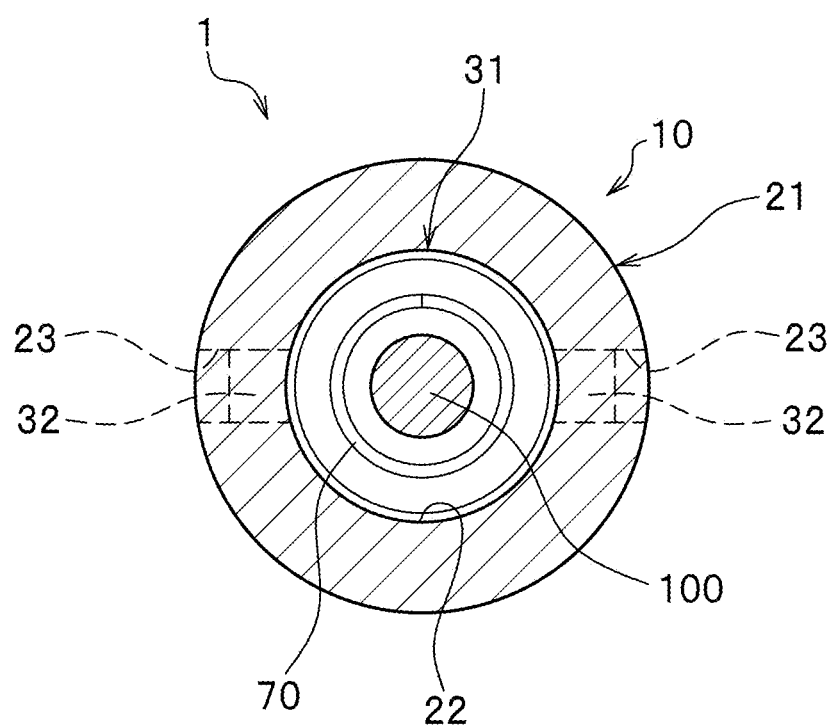
FIG. 3 is a cross-sectional plan view showing the rotating tool according to the first embodiment.
Figure 4:
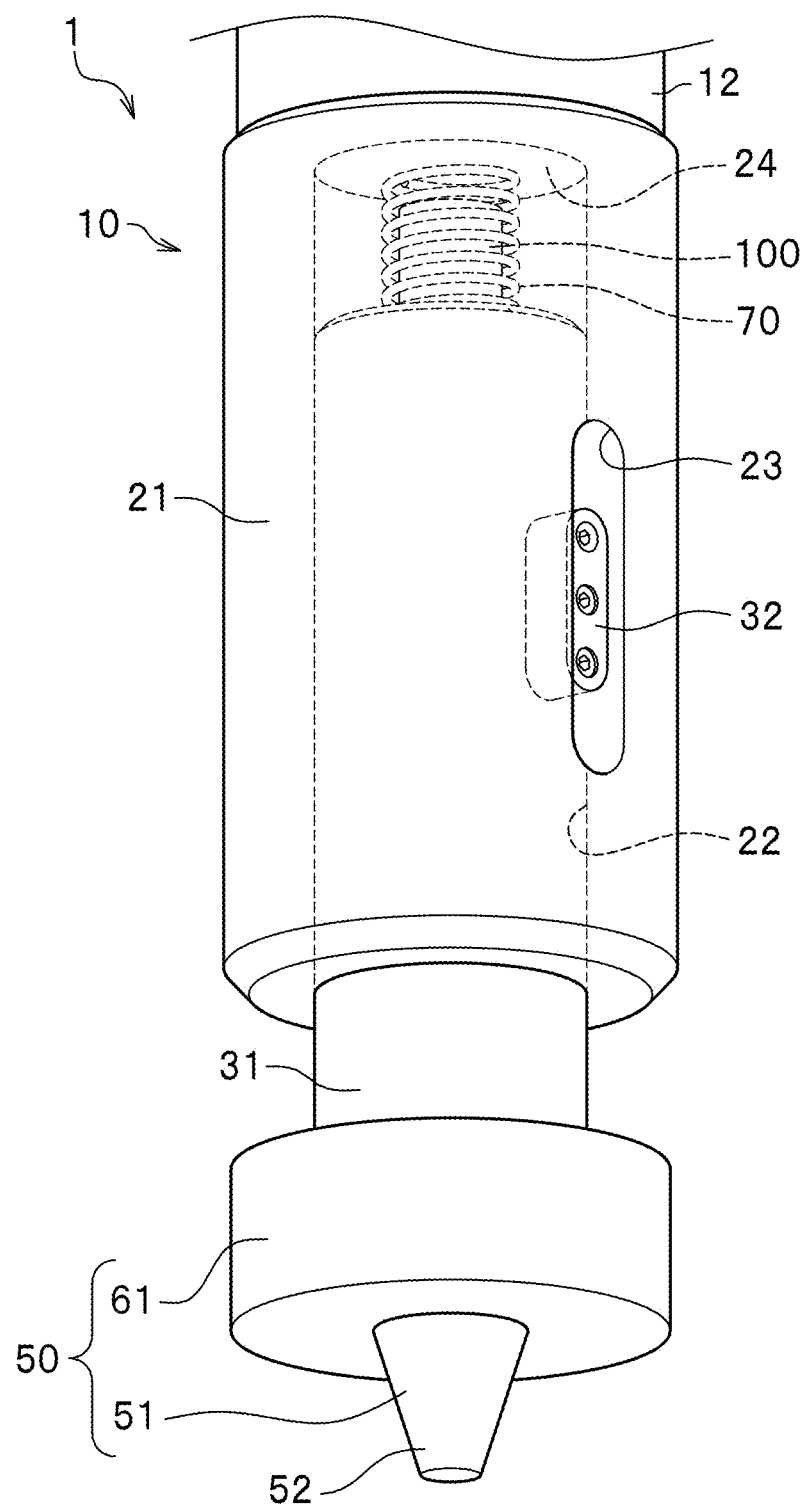
FIG. 4 is a perspective view showing the rotating tool according to the first embodiment.
Figure 5:
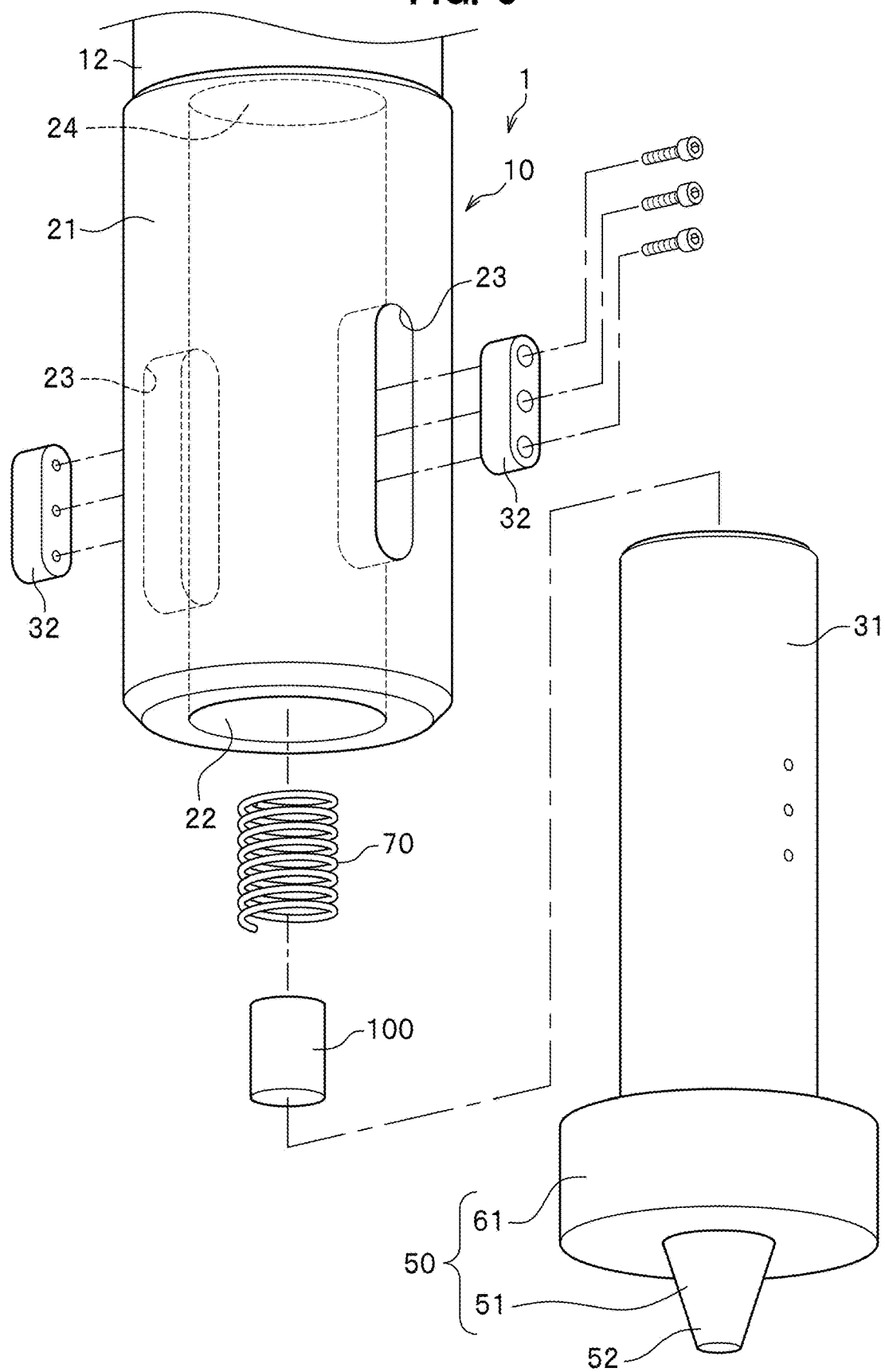
FIG. 5 is an exploded perspective view showing the rotating tool according to the first embodiment.

As also shown in FIGS. 3 and 5, the main body 10 further includes a holder 21 and a slide shaft 31.

<Holder>

The holder 21 is a portion that is attached to the rotating shaft 12, rotates in synchronization with the rotating shaft 12, and supports the slide shaft 31 and the stir member 50. The holder 21 has a bottomed cylinder shape (hollow tube shape) having a bottom portion 24 in a base end portion (end portion on the joining device 3 side: upper end portion in FIG. 1), and a hollow portion inside the holder 21 is a housing recess portion 22 in which the slide shaft 31 is inserted. The housing recess portion 22 has a cylindrical column shape, and is opened toward the distal end side (lower end portion in FIG. 1) in the axial direction of the rotating shaft 12. Key grooves 23 are formed in a cylinder body portion of the holder 21. The key grooves 23 are formed in an obround shape elongating in the axial direction (up-down direction in FIG. 1) of the rotating shaft 12, and penetrate the holder 21 from an outer peripheral surface to an inner peripheral surface of the holder 21. The key grooves 23 do not have to penetrate the cylinder body portion, and may be formed in a groove shape on the inner peripheral surface of the cylinder body portion. The key grooves 23 are arranged at intervals of 180° in a circumferential direction of the cylinder body portion, and are formed at two locations to face each other. Note that the number of key grooves 23 is not limited to two, and may be one or three or more.

<Slide Shaft>

The slide shaft 31 is a portion that is housed in the housing recess portion 22 of the holder 21 to be slidable in a rotating shaft direction (up-down direction in FIG. 1) and that rotates in synchronization (corotates) with the holder 21. The slide shaft 31 has a cylindrical column shape, and has such an outer diameter that the slide shaft 31 can be housed in the housing recess portion 22. An outer peripheral surface of the slide shaft 31 is provided with keys 32 protruding outward. The keys 32 are fixed at positions corresponding to the key grooves 23, and are inserted into the key grooves 23. The keys 32 have an obround shape elongating in the rotating shaft direction, have a width dimension equivalent to the key grooves 23, and have a shorter length dimension than the dimension of the key grooves 23 in a longitudinal direction. In other words, the keys 32 are fitted in the width direction of the key grooves 23, and can move in the longitudinal direction. Note that the shape of the keys 32 is not limited to the obround shape, and may be other shapes such as circle, ellipse, long ellipse, or rectangle shape as long as the keys 32 have a width dimension equivalent to the key grooves 23. The stir member 50 is integrally provided in a distal end portion of the slide shaft 31 (end portion on the side away from the joining device 3: lower end portion in FIG. 1). Accordingly, the stir member 50 is biased toward the distal end side of the slide shaft 31 (side away from the joining device 3: lower side in FIG. 1) by being biased toward the distal end side by the elastic member 70.

<Stir Member>

The stir member 50 is a portion that is provided to be rotatable by receiving the rotating force from the main body 10, and that is provided in the main body 10 to be movable in the axial direction of the rotating shaft 12. The stir member 50 includes a stir pin 51 and a shoulder 61. The stir member 50 is made of, for example, tool steel. In the present embodiment, the stir pin 51 and the shoulder 61 are integrally formed to be a conventional stir member 50. The stir member 50 is formed integrally with the slide shaft 31. Accordingly, the stir member 50 rotates in synchronization with the slide shaft 31, and moves in the axial direction of the rotating shaft 12 by slide movement of the slide shaft 31.

The stir pin 51 is a portion that is inserted into the to-be-joined members while being rotated to perform friction stirring on the to-be-joined members. A distal end portion 52 (lower end portion in FIG. 1) of the stir pin 51 is tapered toward a distal end. The distal end of the distal end portion 52 of the stir pin has a flat surface shape orthogonal to the axial direction. The shoulder 61 is integrally formed in a base end portion of the stir pin 51. A helical groove may be provided on an outer peripheral surface of the stir pin 51.

The shoulder 61 is a portion that presses the to-be-joined members 2 in a state where a lower end surface of the shoulder 61 is in contact with the to-be-joined members 2. The shoulder 61 is formed in a cylindrical column shape formed by increasing the diameter from the base end portion of the stir pin 51, and includes a flat ring-shaped distal end surface (lower end surface). Specifically, the distal end portion 52 of the stir pin 51 protrudes toward the distal end side from the distal end surface of the shoulder 61. In other words, the stir pin 51 hangs down from the lower end surface of the shoulder 61. The shape of the shoulder 61 is not limited to the cylindrical column shape, and may be a frustum shape. Moreover, the lower end surface of the shoulder 61 may have a flat shape or a shape like a mortar. Furthermore, the lower end surface of the shoulder 61 may have an uneven structure. A base end portion of the shoulder 61 is coupled integrally with the slide shaft 31. The shoulder 61 has a larger diameter than the slide shaft 31, and a step portion having a ring shape in a plan view is formed in a coupling portion of the shoulder 61 and the slide shaft 31 (base end portion of the shoulder 61 on the slide shaft 31 side).

<Elastic Member>

The elastic member 70 is a portion that biases the stir member 50 including the stir pin 51 and the shoulder 61 toward the distal end side in the axial direction of the rotating shaft 12. The elastic member 70 is formed of, for example, a coil spring. The elastic member 70 is housed inside the holder 21, and is fitted between the base end portion 31b of the slide shaft 31 and the bottom portion 24 of the holder 21 on the base end side. The elastic member 70 can bias the stir member 50 toward the distal end side against force received from the stir member 50 side.

The elasticity of the elastic member 70 is set such that, when the stir pin 51 is inserted into the to-be-joined members 2 made of at least one material selected from the group consisting of aluminum, copper, magnesium, and alloys of these metals at predetermined plunging load, the stir pin 51 is inserted into the to-be-joined members 2 while changing its position within a predetermined range in an entire movable range of the stir pin 51.

For example, the elasticity is set such that, when the elastic member 70 is a coil spring and the stir pin 51 and the shoulder 61 are inserted with the load applied to the elastic member 70 being 100 kg to 5 t, the stir pin 51 and the shoulder 61 are inserted into the to-be-joined members 2 with deformation being such that a deflection amount of the elastic member 70 is within a range of 0 to 30% of the free length of the elastic member 70. Accordingly, even if the height of the to-be-joined members 2 changes when the stir pin 51 is plunged at a constant height relative to the to-be-joined members 2, the elastic member 70 deforms in accordance with the change in the to-be-joined members 2, and this facilitates maintaining of an insertion amount of the stir pin 51 at a constant amount.

Note that the elastic member 70 is not limited to a coil spring, and may be a metal spring such as a leaf spring or a disc spring or a polymer elastic body (elastomer) of rubber, a polymer resin, a sponge-like resin, or the like. Moreover, the elastic member 70 may be a fluid spring using air pressure, gas pressure, or hydraulic pressure or a magnetic spring using magnetic force or electromagnetic force.

The elastic member 70 only needs to be set to satisfy a relationship between a deformation amount and elasticity in which the stir pin 51 is inserted to a predetermined depth, in consideration of joining conditions. Moreover, the elastic member 70 only needs to be set to satisfy a relationship between the deformation amount and the elasticity in which the shoulder 61 comes into contact with surfaces of the to-be-joined members 2 and is slightly inserted into the to-be-joined members 2, in consideration of joining conditions. The joining conditions that affect the setting of the elastic member 70 include, for example, conditions of the to-be-joined members such as the material of the to-be-joined members 2 and the shape of a joining portion and joining modes such as an insertion depth of the stir pin 51, a contact state of the shoulder 61, and the shape, rotating speed, and moving speed of the rotating tool 1.

<Restriction Member>

The restriction member (loosely-fitted restriction member) 100 is a member that restricts movement of the stir member 50 toward the base end side of the rotating shaft 12 beyond a predetermined range as shown in FIG. 1 and the like. In the present embodiment, the restriction member 100 is arranged in a hollow portion of the elastic member 70 in a loosely-fitted state, inside the holder 21. The restriction member 100 is made of a material that is a metal, a resin, rubber, or the like and that is relatively hard to withstand reaction force in friction stir welding. Although the restriction member 100 has a cylindrical column shape in the present embodiment, the restriction member 100 may be formed as appropriate according to the shape of an arrangement location. The restriction member 100 restricts the movement of the stir member 50 such that an amount of deformation occurring in the elastic member 70 with the movement of the stir member 50 does not exceed the maximum deflection amount (maximum allowable amount) of the elastic member 70.

For example, the maximum deflection amount of the elastic member 70 according to the present embodiment is set to a deflection amount in the case where the elastic member 70 is deformed by 30% of the free length of the elastic member 70. The maximum deflection amount means an amount at which the elastic member 70 is most compressed when elastic force of the elastic member 70 is exerted. When the deflection amount exceeds the maximum deflection amount, the elastic force of the elastic member 70 is not exerted according to the performance, or the elastic member 70 breaks earlier than expected.

As shown in FIG. 2, in the present embodiment, when the deflection amount of the elastic member 70 reaches 30% of the free length of the elastic member 70, in the restriction member 100, a distal end portion (distal end surface) 100a of the restriction member 100 comes into the contact with the base end portion 31b of the slide shaft 31, and a base end portion (base end surface) 100b comes into contact with the bottom portion 24. This can prevent the elastic member 70 from exceeding the maximum deflection amount and deforming. The maximum deflection amount of the elastic member 70 can be set as appropriate depending on the elastic member 70 and the restriction member 100. The maximum deflection amount of the elastic member 70 may be, for example, 25%, 20%, 15%, 10%, or 5%.

Note that, since the elastic member 70 is used in the present embodiment, "maximum deflection amount" is used. Meanwhile, for example, when a different member (fluid spring using air pressure, gas pressure, or hydraulic pressure or magnetic spring using magnetic force or electromagnetic force) is used as the elastic member as described above, an amount at which the elastic force is not exerted or the elastic member breaks if this amount is exceeded is defined as "maximum allowable amount".

Moreover, in the present embodiment, the restriction member 100 is a solid body of a metal or the like, and restricts the movement of the stir member 50 by being brought into contact with the stir member 50. However, the movement of the stir member 50 may be restricted in a contactless manner by using, for example, a fluid spring using air pressure, gas pressure, or hydraulic pressure or a magnetic spring using magnetic force or electromagnetic force.

Furthermore, the shape and arrangement of the restriction member 100 are not limited as long as the restriction member 100 restricts the movement of the stir member 50. For example, the restriction member 100 may be such that part of the main body 10 or the stir member 50 functions as the restriction member 100 or the restriction member 100 is provided by being formed integrally with the main body 10 or the stir member 50. Alternatively, the restriction member 100 may be provided in a form in which a separate member is attached to the main body 10 or the stir member 50.

1-2. Joining Device

Next, a configuration of the joining device 3 including the rotating tool 1 with the above-mentioned configuration is explained. The joining device 3 includes a power unit (not shown) that outputs the rotating force to be transmitted to the rotating shaft 12 of the rotating tool 1 and a position controller (not shown) that holds the fixation portion 11 of the rotating tool 1 and performs position control of the rotating tool. The joining device 3 is formed of, for example, a machining center that performs position control. A position control device is formed of a CPU and the like, and activates the power unit and causes the power unit to move the rotating tool 1 based on position information inputted in advance. The power unit moves the rotating tool 1 in directions of three axes of X, Y, and Z.

1-3. Joining Method

Next, a joining method according to the present invention is explained with reference to FIG. 6. In this joining method, the friction stir welding on the to-be-joined members 2 is performed by moving the rotating tool 1 of the present embodiment such that the rotating tool 1 is located at a predetermined height position set in advance relative to the to-be-joined members 2, and inserting the stir pin 51 and the shoulder 61 into the to-be-joined members 2 to predetermined depths.

In the insertion of the stir pin 51, the distal end of the stir pin 51 first comes into contact with the to-be-joined members 2 as the rotating tool 1 is brought closer to the to-be-joined members 2 in an insertion direction. When the rotating tool 1 is brought even closer to the to-be-joined members 2, the stir pin 51 is inserted into the to-be-joined members 2 while the elastic force by the elastic member 70 biasing the stir member 50 toward the to-be-joined members 2 increases due to compression of the elastic member 70. When the rotating tool 1 is brought further closer to the to-be-joined members 2, the shoulder 61 comes into contact with the to-be-joined members 2. The shoulder 61 is pressed against the to-be-joined members 2 while the elastic force by the elastic member 70 biasing the stir member 50 toward the to-be-joined members 2 further increases due to compression of the elastic member 70. In this case, the elastic member 70 and the joining conditions are set such that the stir pin 51 can be inserted into the to-be-joined members 2 and the shoulder 61 can be slightly inserted into the to-be-joined members 2 in a state where a room for deformation of the elastic member 70 is left to prevent the deflection amount of the elastic member 70 from exceeding the maximum deflection amount. Alternatively, the stir member 50 is pressed against the to-be-joined members 2 in a state where the movement of the stir member 50 is restricted by the restriction member 100 to prevent the deflection amount of the elastic member 70 from exceeding the maximum deflection amount, and the stir pin 51 is thereby inserted into the to-be-joined members 2.

In the joining by the rotating tool 1, the stir pin 51 and the shoulder 61 are biased toward the distal end side by the elastic member 70. As shown in a left portion of FIG. 6, the distal end portion 52 of the stir pin 51 is inserted into the to-be-joined members 2 to the desired depth when there is no error in the height of the to-be-joined members 2 with respect to a set value. The shoulder 61 is slightly inserted into the to-be-joined members 2 in the state where the shoulder 61 is in contact with the to-be-joined members 2.

Figure 6:
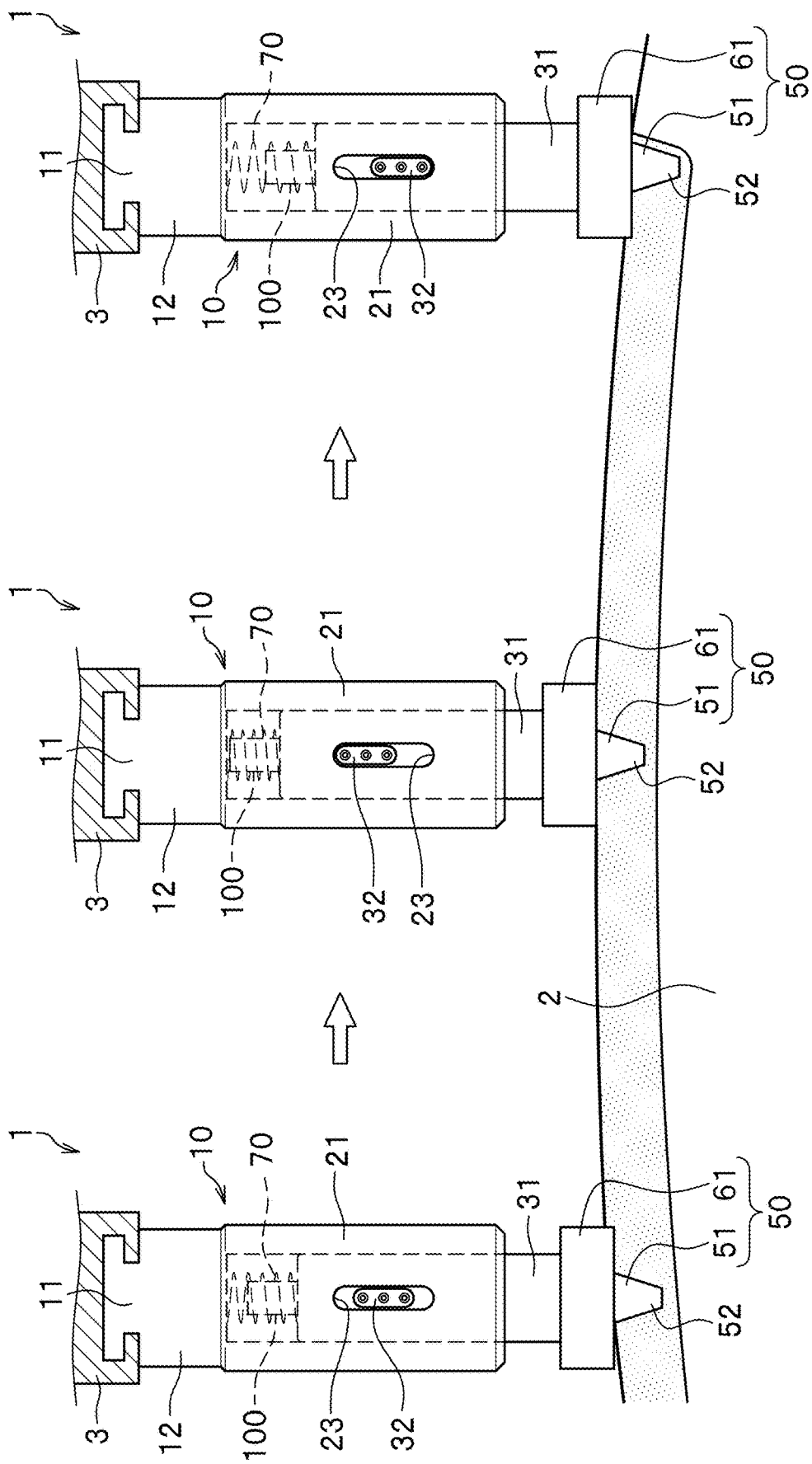
FIG. 6 is a cross-sectional view showing a state of the rotating tool according to the first embodiment in friction stir welding.

Next, explanation is given of the case where the height of the to-be-joined members 2 becomes slightly higher than the set value due to an error while the friction stir welding is performed as shown in a center portion of FIG. 6. In this case, if the elastic member 70 is absent and the stir pin 51 is directly plunged into the to-be-joined members 2, the insertion amounts of the stir pin 51 and the shoulder 61 increase from those in the case where there is no error in the height of the to-be-joined members 2 with respect to the set value, by an amount corresponding to the increase in the height of the to-be-joined members 2.

Meanwhile, when the joining is performed with the rotating tool 1 of the present embodiment, the increase in the height of the to-be-joined members 2 causes the stir member 50 to receive upward reaction force from the to-be-joined members 2 and be pushed upward. Moreover, this upward pushing compresses the elastic member 70, and the stir member 50 is pushed downward by receiving downward elastic force from the elastic member 70. The position of the stir member 50 is changed to a position where the upward reaction force and the downward elastic force generated with the change in the height of the to-be-joined members 2 as descried above balance out. The elastic member 70 is set such that the insertion amounts of the stir pin 51 and the shoulder 61 in this case are about the same as the insertion amounts in the case where there is no error in the height of the to-be-joined members 2 with respect to the set value. If the elastic force of the elastic member 70 is too small, the upward reaction force generated with the change in the height of the to-be-joined members 2 becomes larger than the downward elastic force, and the insertion amounts decrease. Meanwhile, if the elastic force of the elastic member 70 is too large, the downward elastic force generated with the change in the height of the to-be-joined members 2 becomes larger than the upward rection force, and the insertion amounts increase. Specifically, the elastic member 70 is set such that, in the rotating tool 1, the stir pin 51 is inserted into the to-be-joined members 2 to the desired depth set according to the height of the set value of the to-be-joined members 2 and the shoulder 61 is slightly inserted into the to-be-joined members 2 even when the height of the to-be-joined members 2 fluctuates and increases.

Moreover, when the height of the to-be-joined members 2 becomes smaller than the set value, as shown in a right portion of FIG. 6, the elastic member 70 expands and the stir member 50 descends. The elastic member 70 is set such that, in the rotating tool 1, the stir pin 51 is inserted into the to-be-joined members 2 to the desired depth set according to the height of the set value of the to-be-joined members 2 and the shoulder 61 is slightly inserted into the to-be-joined members 2 even when the height of the to-be-joined members 2 fluctuates and decreases as described above.

In the rotating tool 1, since the stir pin 51 and the shoulder 61 are inserted into the to-be-joined members 2 to constant depths by the action of the elastic member 70 as described above, a plasticized region is formed to have a constant depth. Accordingly, stable joining quality can be obtained.

1-4. Operations and Effects

In the rotating tool 1, the joining device 3, and the joining method according to the present embodiment, the stir member 50 provided to be movable in the axial direction of the rotating shaft 12 is biased by the elastic member 70 toward the distal end side, and the stir pin 51 is thereby inserted to a predetermined depth depending on the elasticity of the elastic member 70 when the stir pin 51 is inserted into the to-be-joined members 2. Setting the elastic member 70 in consideration of the joining conditions such as the to-be-joined members and the joining mode allows the stir pin 51 to be inserted to the desired depth. In other words, the rotating tool 1 can perform quasi-load control using the elastic member 70.

When a rotating tool with no elastic member is attached to a joining device such as, for example, a machining center that can perform only the position control, the supporting height of the rotating tool 1 is constant based on a value set by the machining center, and the insertion position of the stir member 50 is substantially constant. Meanwhile, when the rotating tool 1 of the present embodiment is used, the elastic member 70 expands and contracts as appropriate depending on the fluctuation in the height of the to-be-joined members 2, and the stir member 50 is moved in the axial direction even when the supporting height of the rotating tool 1 by the machining center is constant. Using the elasticity of the elastic member 70 as described above enables load control in which the insertion depth of the stir pin 51 into the to-be-joined members 2 can be controlled.

Regarding the load control, when the friction stirring is performed by using, for example, a compressed coil spring as the elastic member, there is a case where the stir pin can be inserted into a relatively-soft aluminum alloy such as 1000 series, but cannot be inserted into a hard aluminum alloy.

This is because compression of the compressed coil spring exceeding the maximum allowable amount (maximum deflection amount) needs to be avoided. In other words, it is difficult to apply load to the rotating tool at such a level that the deflection amount of the compressed coil spring exceeds the maximum deflection amount thereof. Specifically, it is difficult to insert the stir pin into hard to-be-joined members for which the compressed coil spring needs to compressed beyond its limit, while performing simple load control. If the deflection amount of the compressed coil spring exceeds the maximum deflection amount thereof, the spring may break at an early stage.

Incidentally, when the joining device 3 proceeds with the insertion while bringing the stir pin 51 into contact with the to-be-joined members 2 and increasing the load applied to the rotating tool 1 as at, for example, the start position of the friction stir welding, the reaction force that is generated (generated reaction force) and heat generated by friction heat increase as time elapses and the insertion amount increases. Normally, in the friction stir welding, softening of the material caused by the heat generation of the stir pin 51 does not catch up with the insertion of the stir pin 51, and the generated reaction force is highest at the point where the stir pin 51 is plunged to a predetermined depth. When the stir pin 51 is inserted into the to-be-joined members 2 to the predetermined depth and the plunging of the rotating tool 1 stops, the softening of the material caused by the heat generation of the stir pin 51 catches up with the insertion amount of the rotating tool 1, and this can reduce the load applied to the rotating tool 1, and reduce the generated reaction force. Such a state is referred to as "steady state".

Figure 7:
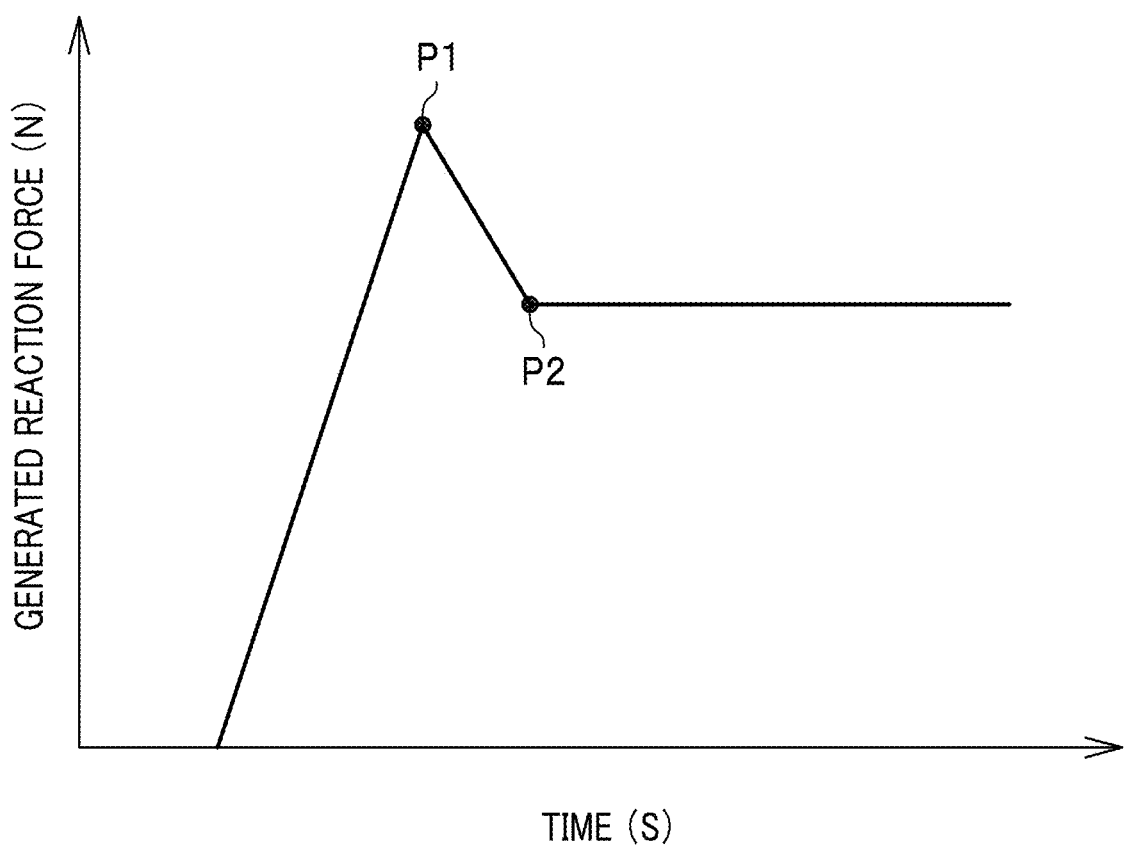
FIG. 7 is a graph showing time and generated reaction force in the friction stir welding of the rotating tool according to the first embodiment.

FIG. 7 is a graph showing time and the generated reaction force in the friction stir welding of the rotating tool according to the first embodiment. The point P1 shows a point where the stir pin 51 is plunged into the to-be-joined members 2 at the greatest degree at the start position of the friction stir welding. The point P2 shows a starting point of the steady state of the friction stir welding. The graph is a straight line rising toward the right side up to the point P1, and the straight line indicates a state where the stir pin 51 is plunged into the to-be-joined members 2. In the friction stir welding, the generated reaction force gradually increases and reaches its peak (point P1) in the plunging of the stir pin 51, slightly decreases according to proceeding of the stir pin 51, and then becomes substantially constant in the steady state (point P2).

The rotating tool 1 according to the present embodiment includes the restriction member 100 that restricts the movement of the stir member 50 toward the base end side in the axial direction. The restriction member 100 thereby restricts the movement of the stir member 50 within a range in which the amount of deflection occurring in the elastic member 70 does not exceed the maximum deflection amount of the elastic member 70 in the insertion of the rotating tool 1 at which the generated reaction force (load) is the largest and at positions where the shape of the to-be-joined members 2 greatly changes. Accordingly, it is possible to avoid the case where the elastic member 70 exceeds its limit and deforms even when the to-be-joined members 2 are relatively hard and large load is required. This allows the stir pin 51 to be inserted also into relatively-hard to-be-joined members 2 while using the elastic member 70, and can also prevent breakage of the elastic member 70 and the rotating tool 1.

Moreover, the stir member 50 is pressed against the to-be-joined members 2 in the state where the stir member 50 restricted by the restriction member 100 is supported by the restriction member 100 (state where the restriction member 100 is in contact with the slide shaft 31 and the bottom portion 24 and is sandwiched therebetween), and the load applied by the joining device is applied to the stir member 50 via the restriction member 100. This allows the stir member 50 to be inserted into the to-be-joined members 2.

Then, in the steady state, the generated reaction force (load) is reduced, the support of the stir member 50 by the restriction member 100 is cancelled, and the stir member 50 not restricted by the restriction member 100 is allowed to move in the axial direction of the rotating shaft 12.

Moreover, the elastic member 70 preferably has an outer diameter and a free length as small (short) as possible to prevent an increase in the size of the rotating tool 1. The smaller the free length of the elastic member 70 is, the larger the spring constant is, provided that the outer diameter of the elastic member 70 is constant. Accordingly, insertion is facilitated also into the relatively-hard to-be-joined members 2. However, an increase of the spring constant tends to increase the generated reaction force (load) with respect to a change amount, and the robustness thus decreases. Specifically, when the spring constant is increased, the stir pin 51 is more likely to be affected by the elastic member 70. Accordingly, there is a problem in which an operation of the stir pin 51 becomes unstable (less controllable) in the steady state.

In this respect, according the present embodiment, since the restriction member 100 restricts the movement of the slide shaft 31, stress can be applied to the stir member 50 via the restriction member 100 without an increase of the spring constant of the elastic member 70. This allows the stir member 50 to be inserted also into the relatively-hard to-be-joined members 2. Moreover, since the spring constant of the elastic member 70 does not have to be increased by an amount corresponding to provision of the restriction member 100, the degree of freedom in design of the elastic member 70 increases, and it is possible to improve the robustness in the steady state and stably control the stir pin 51.

The main body 10 further includes the cylindrical holder 21 and the slide shaft 31 that is housed in the center portion of the holder 21 to be slidable in the rotating shaft direction and that rotates in synchronization with the holder 21, and the stir member 50 is provided at the distal end of the slide shaft 31. This allows the stir member 50 to slide in the rotating shaft direction while allowing the rotating force from the main body 10 to be transmitted to the stir member 50.

The elastic member 70 is housed inside the holder 21, and is arranged between the base end portion of the slide shaft 31 and the bottom portion 24 of the holder 21 on the base end side. The elastic member 70 can thereby receive the force received from the stir pin 51 side at the bottom portion 24 of the holder 21. Accordingly, even if the slide shaft 31 moves, the elastic member 70 stably biases the stir pin 51 toward the distal end side, and the accuracy of the load control of the stir pin 51 can be thereby improved.

Moreover, the key grooves 23 are formed in the holder 21, and the keys 32 are formed in the slide shaft 31. The slide shaft 31 and the stir member 50 are thereby allowed to move in the axial direction in a stable state while rotating in synchronization with the rotation of the rotating shaft and the holder 21. Accordingly, the operation of the stir member 50 is further stabilized.

The elastic member 70 is an elastic member that applies elastic force by using at least one selected from a solid spring, a fluid spring, magnetic force, and electromagnetic force. According to such a configuration, the elasticity of the elastic member 70 can be easily adjusted.

The stir member 50 includes the shoulder 61 with the column shape or the frustum shape that is coupled to the slide shaft 31 and that has a lower end surface with the flat surface shape or the shape like a mortar, the lower end surface configured to come into contact with the to-be-joined members 2. Moreover, the stir pin 51 hangs down from the lower end surface of the shoulder 61. According to such a configuration, the insertion depths of the stir pin 51 and the shoulder 61 into the to-be-joined members 2 can be controlled by using the elasticity of the elastic member 70. Moreover, since the shoulder 61 presses the surfaces of the to-be-joined members 2, the finish of the surface after the friction stir welding is improved.

The joining device 3 includes the rotating tool 1, the power unit, and the position controller. The friction stir welding on the to-be-joined members 2 is performed by causing the position controller to move the rotating tool 1 such that the rotating tool 1 is located at the predetermined height position relative to the to-be-joined members 2, and insert the stir pin 51 into the to-be-joined members 2. According to the joining device 3 as described above, it is possible to perform the friction welding while performing the load control in which the insertion depth of the stir pin 51 into the to-be-joined members 2 is controlled by using the elasticity of the elastic member 70.

In the joining device 3, the rotating tool 1 is the conventional rotating tool 1 including the stir pin 51 and the shoulder 61, and the friction stir welding on the to-be-joined members 2 is performed by inserting the stir pin 51 and the shoulder 61 rotating together with the stir pin 51 into the to-be-joined members 2. The shoulder 61 thereby presses the surfaces of the to-be-joined members 2, and the finish of the surface after the friction stir welding is thus improved.

In the present joining method, the friction stir welding on the to-be-joined members 2 is performed by moving the rotating tool 1 such that the rotating tool 1 is located at the predetermined height position relative to the to-be-joined members 2 and inserting the stir pin 51 into the to-be-joined members 2. According to the present joining method, it is possible to perform the friction stir welding while performing the load control in which the insertion depth of the stir pin 51 into the to-be-joined members 2 is controlled by using the elasticity of the elastic member 70.

The present joining method is a method in which the rotating tool 1 is the conventional rotating tool 1 including the stir pin 51 and the shoulder 61, and the friction stir welding is performed by inserting the stir pin 51 and the shoulder 61 rotating together with the stir pin 51 into the to-be-joined members 2. The shoulder 61 thereby presses the surfaces of the to-be-joined members 2, and the finish of the surface after the friction stir welding is thus improved.

As described above, according to the rotating tool 1, the joining device 3, and the joining method, even in the state where the rotating tool is attached to a machining center that performs only the position control, it is possible to perform the friction stir welding while performing the load control by using the elastic member 70. Moreover, according to the rotating tool 1, the joining device 3, and the joining method, it is possible to insert the stir pin into a relatively-hard to-be-joined members while preventing the breakage of the elastic member 70 and perform the friction stir welding while performing the load control by using the restriction member 100.

2. First Modified Example

Figure 8:
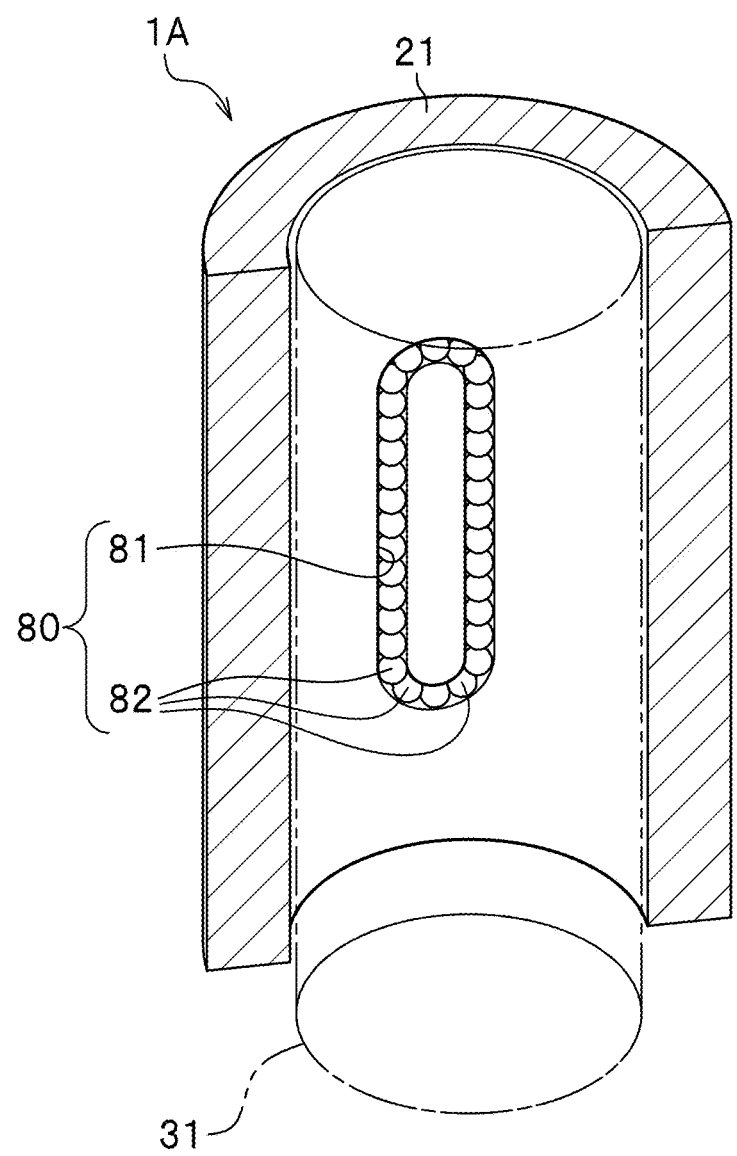
FIG. 8 is a partial cutaway perspective view showing a rotating tool according to a first modified example of the first embodiment of the present invention.
Figure 9:
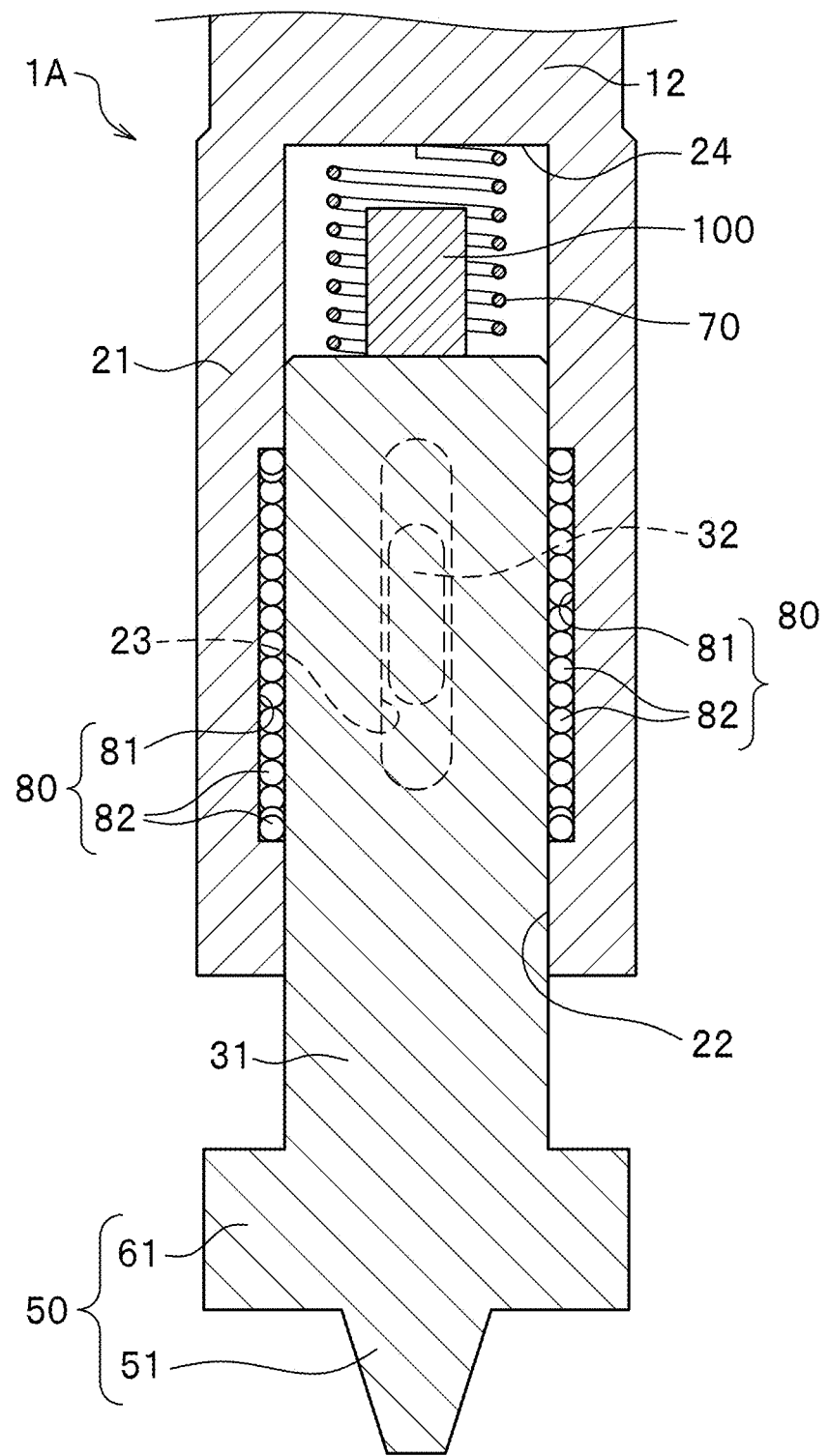
FIG. 9 is a vertical cross-sectional view showing a rotating tool according to a second modified example of the first embodiment of the present invention.

Next, a rotating tool 1A according to a first modified example is explained with reference to FIGS. 8 and 9. As shown in FIGS. 8 and 9, the rotating tool 1A according to the first modified example is provided with a slider 80 inside the holder 21. The slider 80 is provided on the inner peripheral surface of the holder 21. The slider 80 is formed of bearing grooves 81 formed on the inner peripheral surface of the holder 21 and multiple balls 82, 82, . . . that slide and move inside the bearing grooves 81. The bearing grooves 81 are formed in an obround shape elongating in the axial direction in a side view. The depth of the bearing grooves 81 is smaller than the diameter of the balls 82. Multiple balls 82 are arranged inside the bearing grooves 81. One portions of the balls 82 come into sliding contact with the outer peripheral surface of the slide shaft 31 while other portions of the balls 82 come into sliding contact with inner surfaces of the bearing grooves 81. Since other configurations are similar to those in the above-mentioned embodiment, the other configurations are denoted by the same reference numerals, and explanation thereof is omitted. According to the rotating tool 1A with such a configuration, the slide shaft 31 can be smoothly moved in the axial direction relative to the holder 21.

3. Second Modified Example

Figure 10:
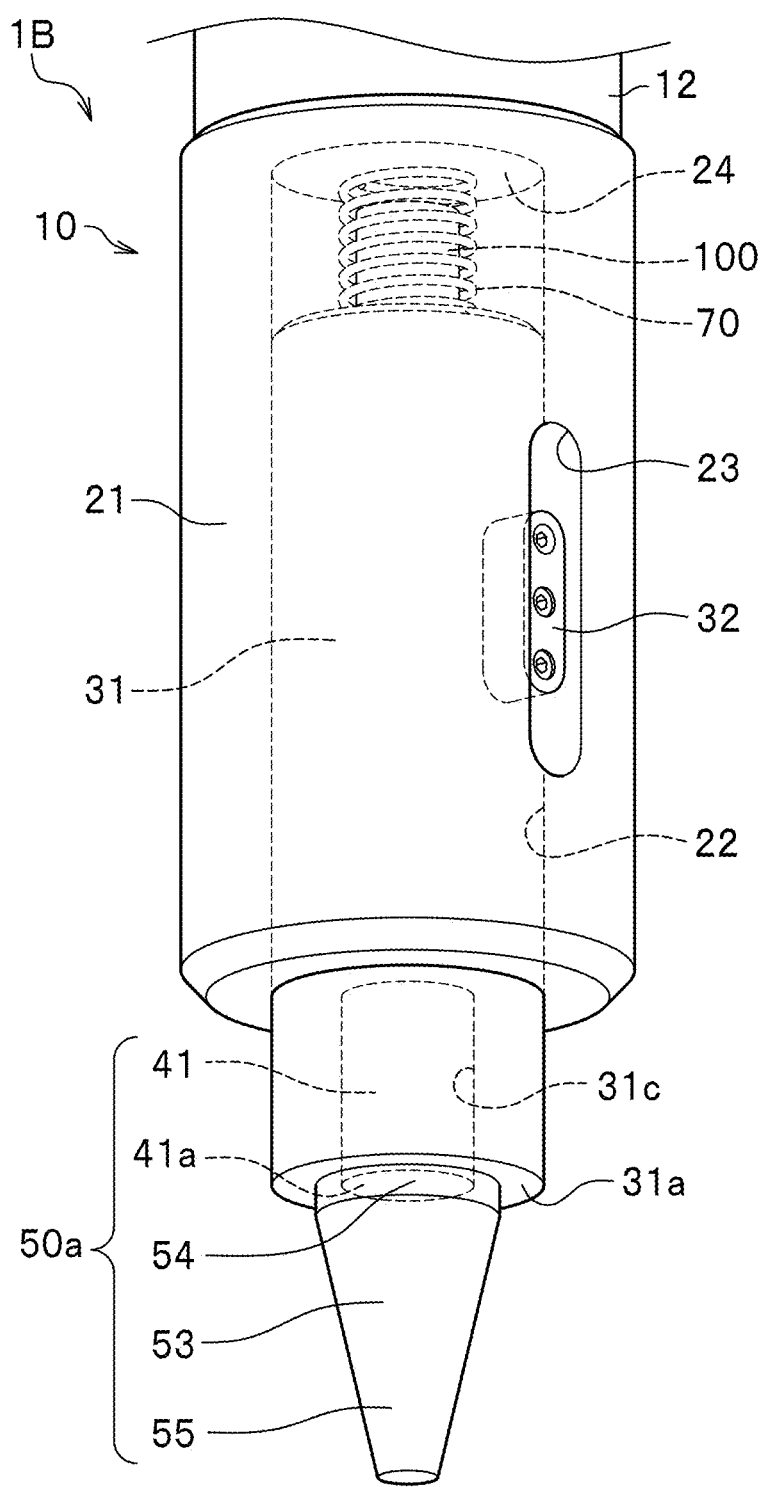
FIG. 10 is a perspective view showing the rotating tool according to the second modified example of the first embodiment of the present invention.

Next, a rotating tool 1B according to a second modified example is explained with reference to FIG. 10. Although the stir member 50 is the conventional stir member including the stir pin 51 and the shoulder 61 in the first embodiment, the stir member is not limited to this. As shown in FIG. 10, a stir member 50a in the second modified example is a shoulder-less stir member that includes no shoulder. Since other configurations are similar to those in the above-mentioned embodiment, the other configurations are denoted by the same reference numerals, and explanation thereof is omitted.

The shoulder-less stir member 50a includes a coupling portion 41 that has a cylindrical column shape and that is coupled to the slide shaft 31 and a stir pin 53 that is formed integrally with a distal end portion 41a of the coupling portion 41. The coupling portion 41 has a smaller diameter than the slide shaft 31, and is inserted in a recess portion 31c having a cylindrical column shape and provided in a distal end portion (distal end surface) 31a of the slide shaft 31. The stir member 50a is provided at a distal end of the slide shaft 31 by being fixed to the slide shaft 31 in this state. Accordingly, the stir member 50a rotates in synchronization with the slide shaft 31, and moves in the axial direction of the rotating shaft 12 by slide movement of the slide shaft 31.

The stir pin 53 is formed integrally with the distal end portion (distal end surface) 41a of the coupling portion 41 at a base end portion 54 of the stir pin 53, and protrudes (hangs down) from the distal end portion (lower end surface) 41a of the coupling portion 41 toward the distal end side. Moreover, a distal end portion 55 of the stir pin 53 is tapered from the base end portion 54 side toward a distal end. In the stir pin 53, the diameter of the base end portion 54 is larger than the diameter of the distal end portion 41a of the coupling portion 41, and is smaller than the diameter of the slide shaft 31. A helical groove may be provided on an outer peripheral surface of the stir pin 53.

Note that, although the base end portion 54 of the stir pin 53 and the distal end portion 41a of the coupling portion 41 have different diameters and include a step on the outer peripheral surfaces thereof in the present modified example, the configuration may be such that the base end portion 54 of the stir pin 53 and the distal end portion 41a of the coupling portion 41 have the same diameter and the outer peripheral surfaces thereof are continuously formed. Moreover, although the base end portion 54 of the stir pin 53 and the distal end portion 31a of the slide shaft 31 have different diameters and include a step on the outer peripheral surfaces thereof in the present modified example, the configuration may be such that the base end portion 54 of the stir pin 53 and the distal end portion 31a of the slide shaft 31 have the same diameter and the outer peripheral surfaces are continuously formed. Furthermore, although the case where the stir member 50a is provided as a body separate from the slide shaft 31 and the stir member 50a and the slide shaft 31 are coupled to each other is described as an example in the present modified example, the stir member 50a and the slide shaft 31 may be integrally formed. Moreover, the shape of the coupling portion 41 is not limited to the cylindrical column shape, and may be a frustum shape.

According to the rotating tool 1B in the present embodiment, it is possible to perform the load control in which the insertion depth of the stir pin 53 into the to-be-joined members 2 can be controlled by using the elasticity of the elastic member 70 as in the rotating tool 1 according to the first embodiment. Moreover, according to the rotating tool 1B in the present embodiment that includes the shoulder-less stir member, it is possible to reduce pressing force of the rotating tool 1B in the friction stir welding.

Moreover, in the joining device and the joining method including the rotating tool 1B including the shoulder-less stir member as described above, the friction stir welding on the to-be-joined members 2 is performed by causing the position controller to move the rotating tool 1B such that the rotating tool 1B is located at the predetermined height position relative to the to-be-joined members, and insert only the stir pin 53 into the to-be-joined members 2 with the slide shaft 31 and the coupling portion 41 separated from the to-be-joined members. According to the joining device and the joining method as described above, it is possible to reduce the width of the plasticized region and reduce pressing force of the rotating tool 1B from those in the case where a shoulder portion of the rotating tool 1B is plunged. Moreover, load applied to the friction stir device can be reduced from that in the case where the shoulder portion of the rotating tool 1B is plunged. Furthermore, joining can be performed at a deep position in the butting portion with no large load applied to the friction stir device. Moreover, providing the coupling portion 41 can facilitate attachment and detachment of the slide shaft 31 and the stir pin 53 formed integrally with the coupling portion 41.

4. Second Embodiment

Figure 11:
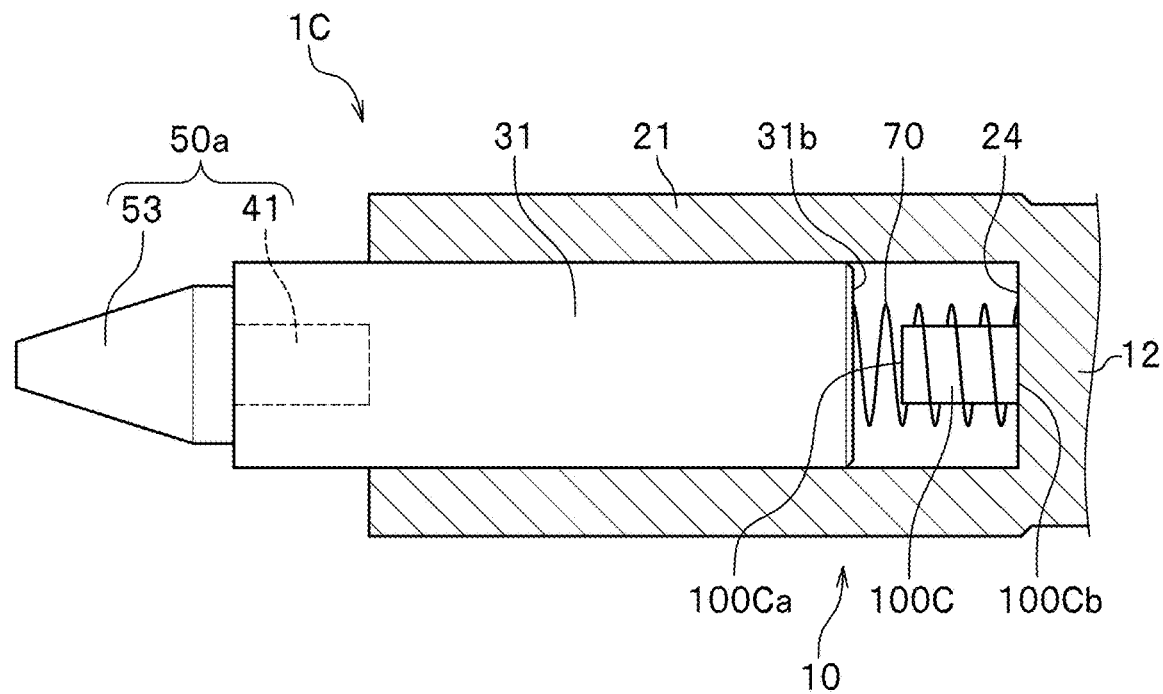
FIG. 11 is a schematic view showing a rotating tool according to a second embodiment of the present invention.
Figure 12:
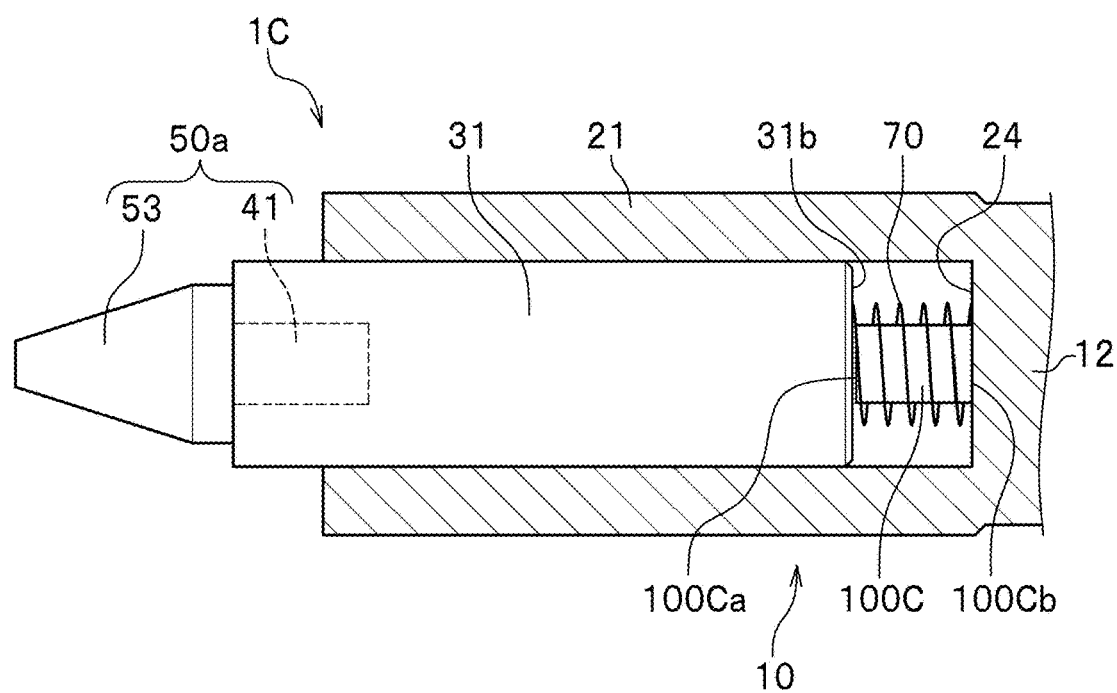
FIG. 12 is a schematic view showing a most-contracted state of the rotating tool according to the second embodiment.

Next, a rotating tool 1C according to a second embodiment is explained with reference to FIGS. 11 and 12. The rotating tool 1C according to the second embodiment includes the main body 10 including the holder 21 and the slide shaft 31, the stir member 50a including the coupling portion 41 and the stir pin 53, the elastic member 70, and a restriction member 100C. Since basic configurations are the same as those in the above-mentioned embodiment and modified examples, the basic configurations are denoted by the same reference numerals, and explanation thereof is omitted.

The restriction member (base end side fixed restriction member) 100C according to the present embodiment is provided by being fixed to the bottom portion 24 of the holder 21. Specifically, a base end portion 100Cb of the restriction member 100C and the bottom portion 24 are constantly connected to each other. As shown in FIG. 12, a distal end portion 100Ca of the restriction member 100C and the base end portion 31b of the slide shaft 31 come into contact with each other before the elastic member 70 reaches the maximum deflection amount, and the movement of the slide shaft 31 and the stir pin 53 (stir member 50a) toward the base end side can be restricted.

The present embodiment can also provide effects substantially the same as those in the first embodiment. In addition, according to the present embodiment, the restriction member 100C is provided in the bottom portion 24 of the holder 21, and this can avoid the case where the restriction member and the elastic member 70 come into contact with each other due to free moving of the restriction member inside the holder 21. Moreover, since the restriction member 100C can be fixed at a fixed position, the distal end portion 100Ca of the restriction member 100C and the base end portion 31b of the slide shaft 31 can be brought into contact at a certain position, and the rotating tool 1C can receive the reaction force generated with the insertion of the rotating tool 1C at a predetermined position, and perform a stable operation.

5. Third Embodiment

Figure 13:
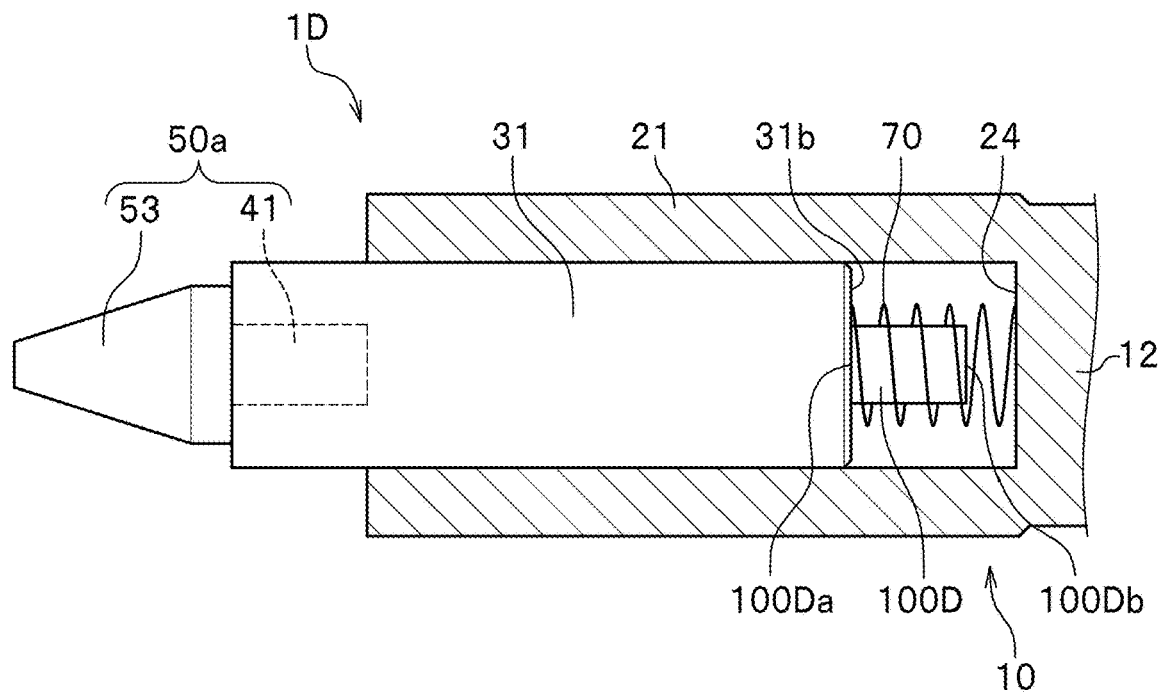
FIG. 13 is a schematic view showing a rotating tool according to a third embodiment of the present invention.
Figure 14:
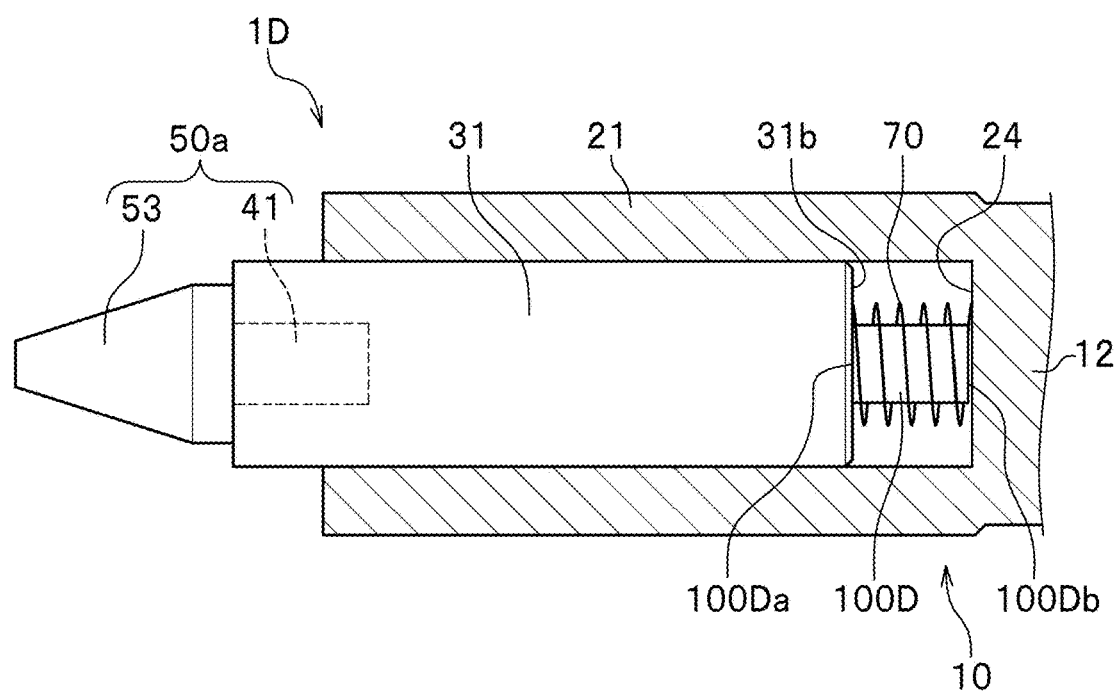
FIG. 14 is a schematic view showing a most-contracted state of the rotating tool according to the third embodiment.

Next, a rotating tool 1D according to a third embodiment is explained with reference to FIGS. 13 and 14. The rotating tool 1D according to the third embodiment includes the main body 10 including the holder 21 and the slide shaft 31, the stir member 50a including the coupling portion 41 and the stir pin 53, the elastic member 70, and a restriction member 100D. Since basic configurations are the same as those in the above-mentioned embodiments and modified examples, the basic configurations are denoted by the same reference numerals, and explanation thereof is omitted.

The restriction member (distal end side fixed restriction member) 100D according to the present embodiment is provided by being fixed to the slide shaft 31. Specifically, a distal end portion 100Da of the restriction member 100D and the base end portion 31b of the slide shaft 31 are constantly connected to each other. As shown in FIG. 14, a base end portion 100Db of the restriction member 100D and the bottom portion 24 of the holder 21 come into contact with each other before the elastic member 70 reaches the maximum deflection amount, and the movement of the slide shaft 31 and the stir pin 53 (stir member 50a) toward the base end side can be restricted.

The present embodiment can also provide effects substantially the same as those in the first embodiment. In addition, according to the present embodiment, the restriction member 100D is provided in the slide shaft 31, and this can avoid the case where the restriction member and the elastic member 70 come into contact with each other due to free moving of the restriction member inside the holder 21. Moreover, since the restriction member 100D can be fixed at a fixed position, the base end portion 100Db of the restriction member 100D and the bottom portion 24 of the holder 21 can be brought into contact at a certain position, and the rotating tool 1D can receive the reaction force generated with the insertion of the rotating tool 1D at a predetermined position, and perform a stable operation.

6. Fourth Embodiment

Figure 15:
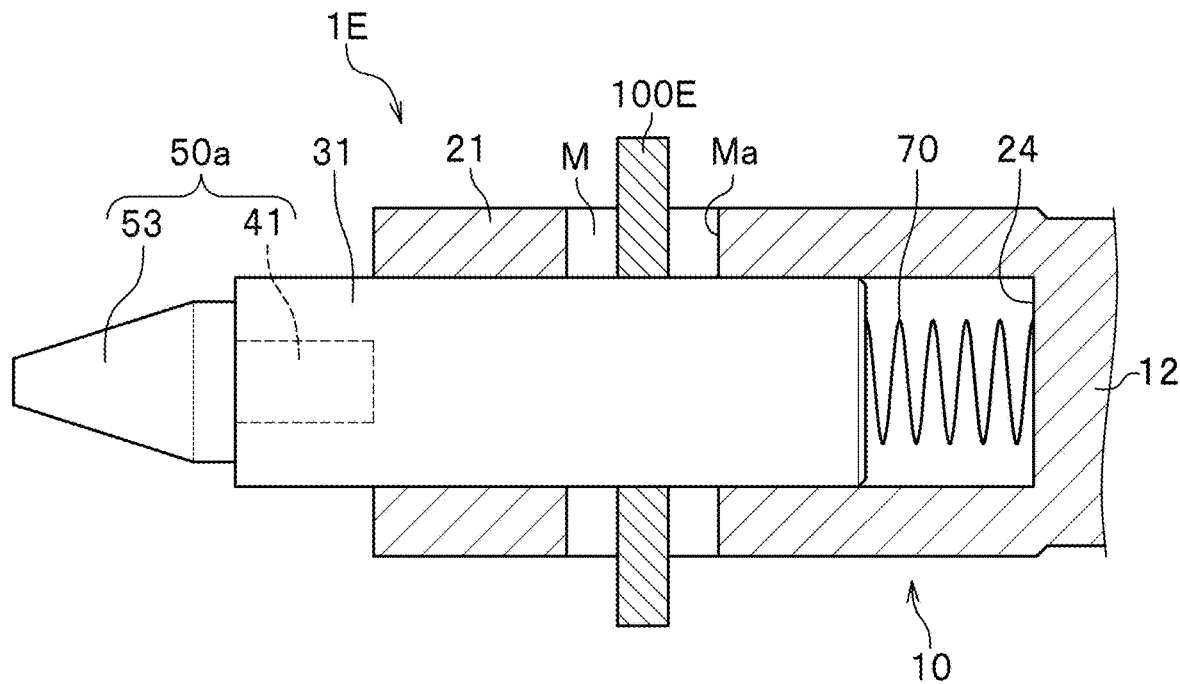
FIG. 15 is a schematic view showing a rotating tool according to a fourth embodiment of the present invention.
Figure 16:
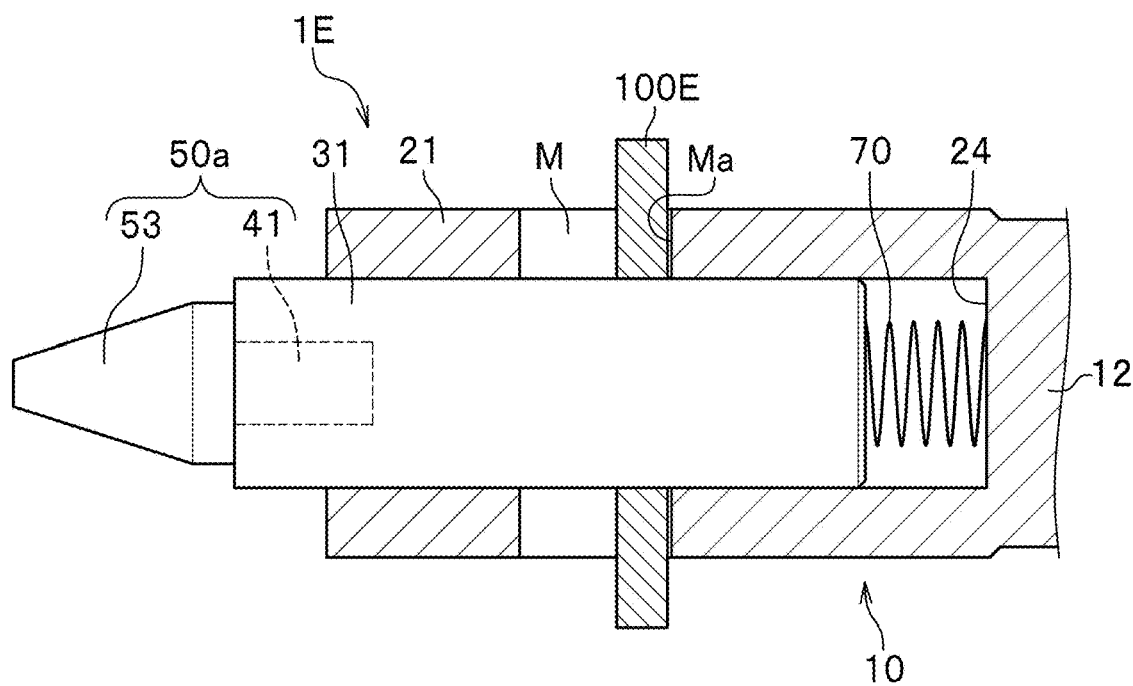
FIG. 16 is a schematic view showing a most-contracted state of the rotating tool according to the fourth embodiment.

Next, a rotating tool 1E according to a fourth embodiment is explained with reference to FIGS. 15 and 16. The rotating tool 1E according to the fourth embodiment includes the main body 10 including the holder 21 and the slide shaft 31, the stir member 50a including the coupling portion 41 and the stir pin 53, the elastic member 70, and restriction members 100E. Since basic configurations are the same as those in the above-mentioned embodiments and modified examples, the basic configurations are denoted by the same reference numerals, and explanation thereof is omitted.

The restriction members (intermediate restriction members) 100E according to the present embodiment are provided by being fixed to the outer peripheral surface (side surface portion) of the slide shaft 31. Particularly, the restriction members 100E are provided on an outer peripheral surface at the center of the slide shaft 31 in the axial direction. The restriction members 100E are plate-shaped members protruding out in a radially-outward direction, perpendicularly from the outer peripheral surface of the slide shaft 31. One or multiple restriction members 100E may be formed. The restriction members 100E are formed to move inside through-holes M in the axial direction with the movement of the slide shaft 31, the through-holes M penetrating the holder 21 in the radially-outward direction. As shown in FIG. 16, the restriction members 100E and hole walls (intermediate portion of the holder) Ma of the through-holes M on the base end side come into contact with one another before the elastic member 70 reaches the maximum deflection amount, and the movement of the slide shaft 31 and the stir pin 53 (stir member 50a) toward the base end side can be restricted.

Note that, although the through-holes M of the holder 21 are set as the "intermediate portion" in the present embodiment, it is possible to set other portions of the holder 21 as the "intermediate portion" and bring the intermediate portion and the restriction members 100E into contact with one another. Moreover, the through-holes M and the restriction members 100E may be achieved by the key grooves 23 and the keys 32.

The present embodiment can also provide effects substantially the same as those in the first embodiment. In addition, according to the present embodiment, the restriction members 100E are provided on the outer peripheral surface of the slide shaft 31, and can thereby avoid interference with the elastic member 70 housed inside the holder 21. Accordingly, for example, even when the restriction members cannot be housed inside the holder 21 together with the elastic member due to effects of the structure, shape, operation, or function of the elastic member, the restriction members 100E provided on the outer peripheral surface can restrict the movement of the stir member 50a. Thus, the degree of freedom in design can be improved.

6. Fifth Embodiment

Figure 17:
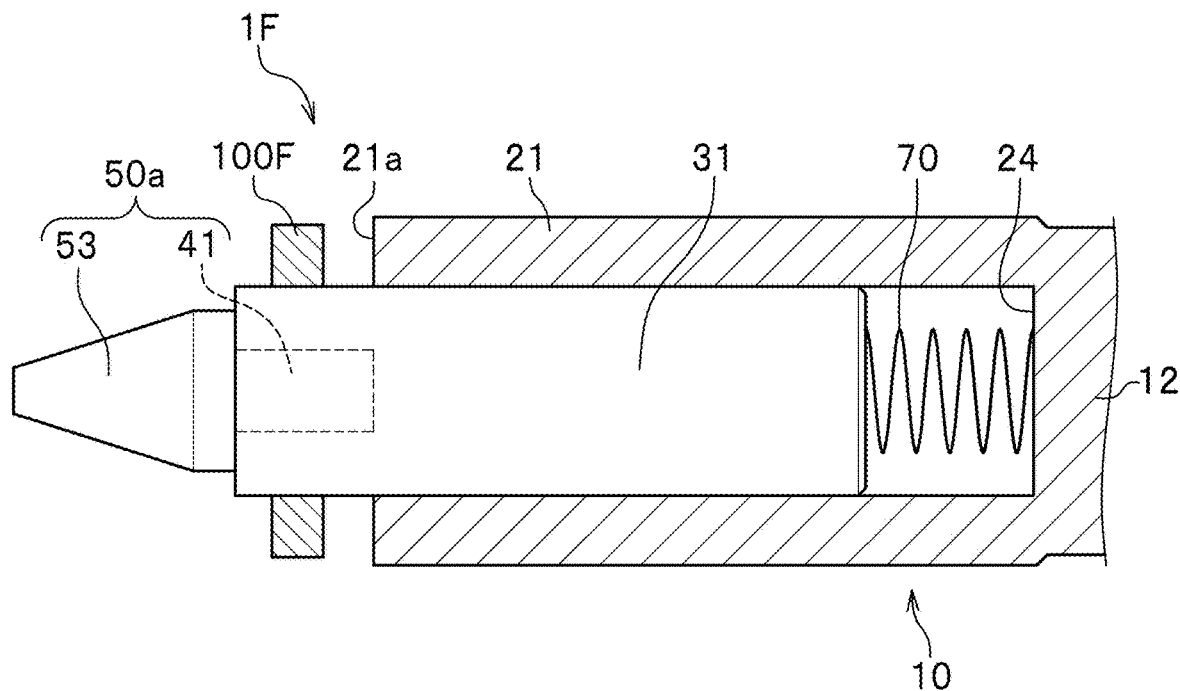
FIG. 17 is a schematic view showing a rotating tool according to a fifth embodiment of the present invention.
Figure 18:
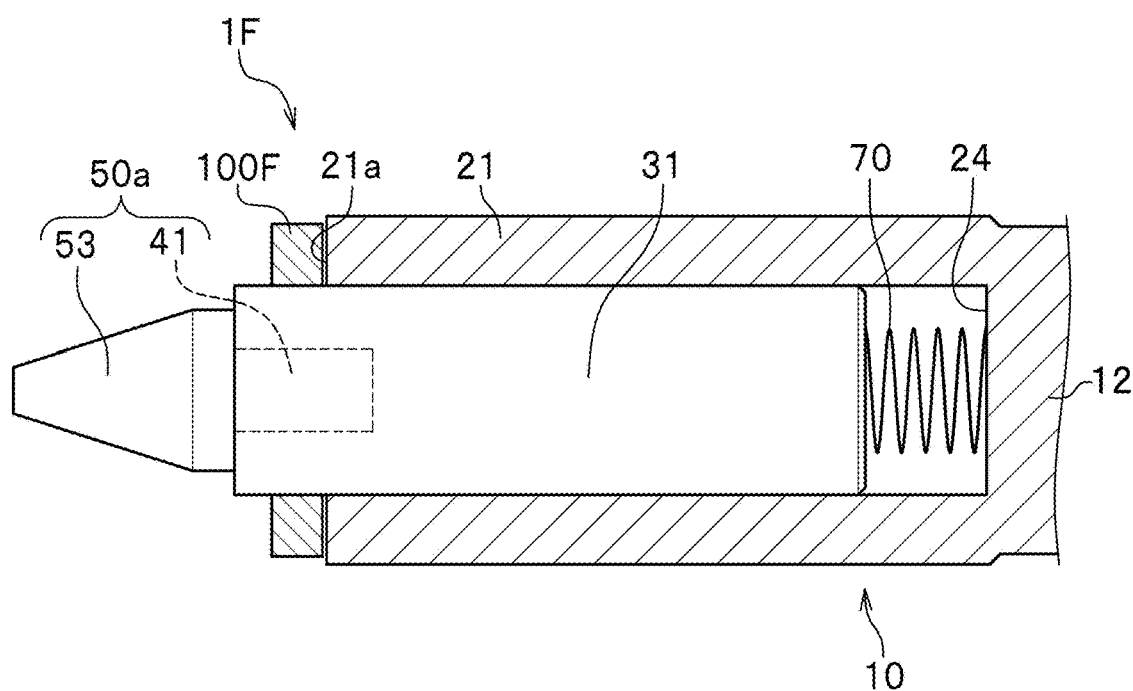
FIG. 18 is a schematic view showing a most-contracted state of the rotating tool according to the fifth embodiment.

Next, a rotating tool 1F according to a fifth embodiment is explained with reference to FIGS. 17 and 18. The rotating tool 1F according to the fifth embodiment includes the main body 10 including the holder 21 and the slide shaft 31, the stir member 50a including the coupling portion 41 and the stir pin 53, the elastic member 70, and restriction members 100F. Since basic configurations are the same as those in the above-mentioned embodiments and modified examples, the basic configurations are denoted by the same reference numerals, and explanation thereof is omitted.

The restriction members (distal end side restriction members) 100F according to the present embodiment are provided by being fixed to the outer peripheral surface (side surface portion) of the slide shaft 31. Particularly, the restriction members 100F are provided on an outer peripheral surface on the distal end side of the slide shaft 31. The restriction members 100F are plate-shaped members protruding out in the radially-outward direction, perpendicularly from the outer peripheral surface of the slide shaft 31. One or multiple restriction members 100F may be formed. As shown in FIG. 18, the restriction members 100F and a distal end portion 21a of the holder 21 come into contact with one another before the elastic member 70 reaches the maximum deflection amount, and the movement of the slide shaft 31 and the stir pin 53 (stir member 50a) toward the base end side can be restricted.

The present embodiment can also provide effects substantially the same as those in the first embodiment. In addition, according to the present embodiment, the restriction members 100F are provided on the outer peripheral surface of the slide shaft 31, and can thereby avoid interference with the elastic member 70 housed inside the holder 21. Accordingly, for example, even when the restriction members cannot be housed inside the holder 21 together with the elastic member due to effects of the structure, shape, operation, or function of the elastic member, the restriction members 100F provided on the outer peripheral surface can restrict the movement of the stir member 50a. Thus, the degree of freedom in design can be improved. Moreover, according to the present embodiment, in contrast to the case where the through-holes M and the restriction members 100E are achieved by the key grooves 23 and the keys 32 and the restriction members 100E and the key grooves 23 come into contact with one another, application of load to the key grooves 23 can be avoided because the restriction members 100F and the distal end portion 21a of the holder 21 come into contact with one another.

8. Sixth Embodiment

Figure 19:
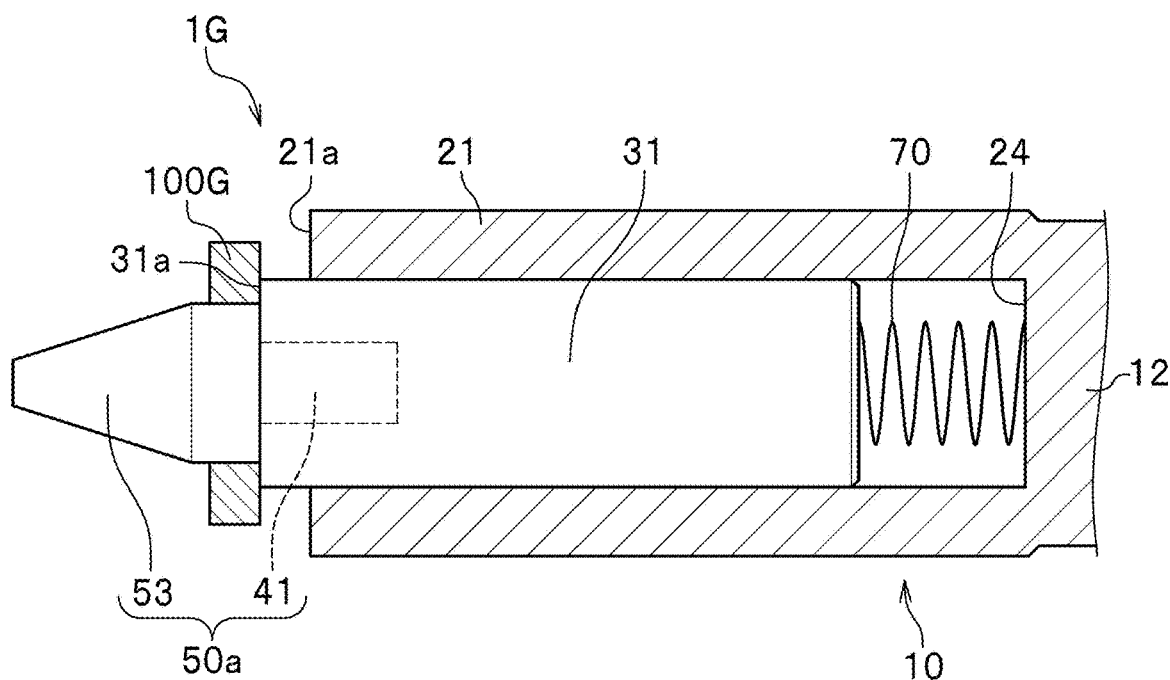
FIG. 19 is a schematic view showing a rotating tool according to a sixth embodiment of the present invention.
Figure 20:
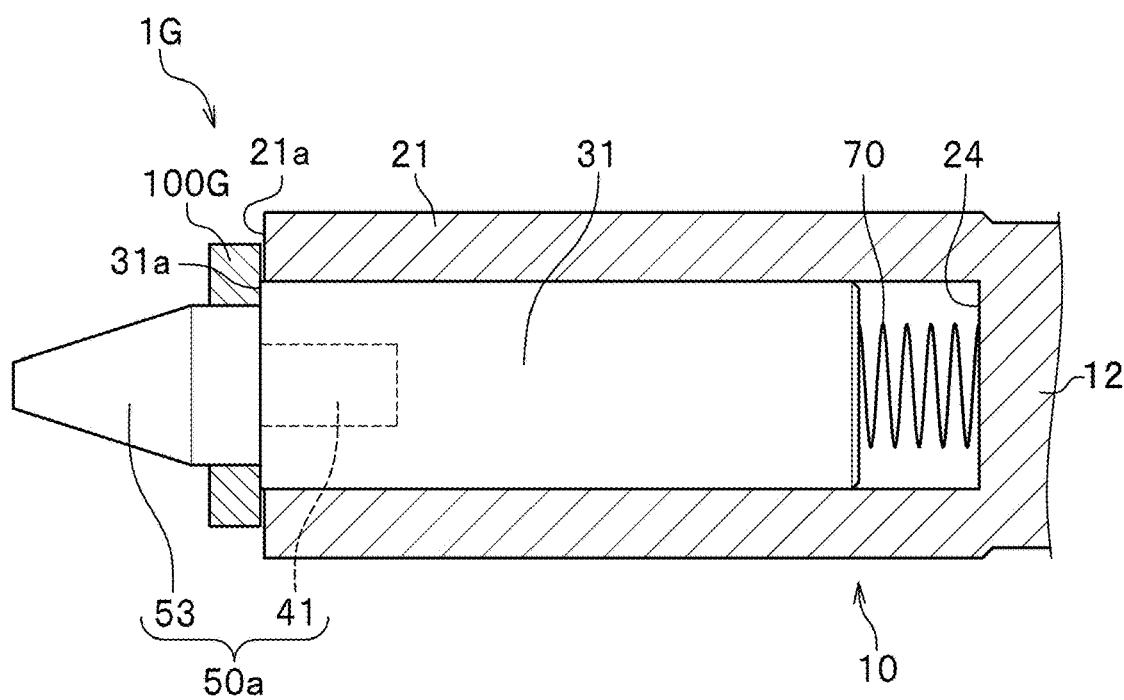
FIG. 20 is a schematic view showing a most-contracted state of the rotating tool according to the sixth embodiment.

Next, a rotating tool 1G according to a sixth embodiment is explained with reference to FIGS. 19 and 20. The rotating tool 1G according to the sixth embodiment includes the main body 10 including the holder 21 and the slide shaft 31, the stir member 50a including the coupling portion 41 and the stir pin 53, the elastic member 70, and restriction members 100G. Since basic configurations are the same as those in the above-mentioned embodiments and modified examples, the basic configurations are denoted by the same reference numerals, and explanation thereof is omitted.

The restriction members (distal end surface restriction members) 100G according to the present embodiment are provided by being fixed to a distal end portion (distal end surface) 31a of the slide shaft 31. The restriction members 100G are plate-shaped members protruding out in the radially-outward direction, perpendicularly from the distal end portion (distal end surface) 31a of the slide shaft 31. The restriction members 100G protrude outward beyond the outer peripheral surface of the slide shaft 31. One or multiple restriction members 100G may be formed. As shown in FIG. 20, the restriction members 100G and the distal end portion 21a of the holder 21 come into contact with one another before the elastic member 70 reaches the maximum deflection amount, and the movement of the slide shaft 31 and the stir pin 53 (stir member 50a) toward the base end side can be restricted.

The present embodiment can also provide effects substantially the same as those in the first embodiment. In addition, according to the present embodiment, the restriction members 100G are provided in the distal end portion of the slide shaft 31, and can thereby avoid interference with the elastic member 70 housed inside the holder 21. Accordingly, for example, even when the restriction members cannot be housed inside the holder 21 together with the elastic member due to effects of the structure, shape, operation, or function of the elastic member, the restriction members 100G provided in the distal end portion can restrict the movement of the stir member 50a. Thus, the degree of freedom in design can be improved. Moreover, according to the present embodiment, in contrast to the case where the through-holes M and the restriction members 100E are achieved by the key grooves 23 and the keys 32 and the restriction members 100E and the key grooves 23 come into contact with one another, application of load to the key grooves 23 can be avoided because the restriction members 100G and the distal end portion 21a of the holder 21 come into contact with one another.

9. Seventh Embodiment

Figure 21:
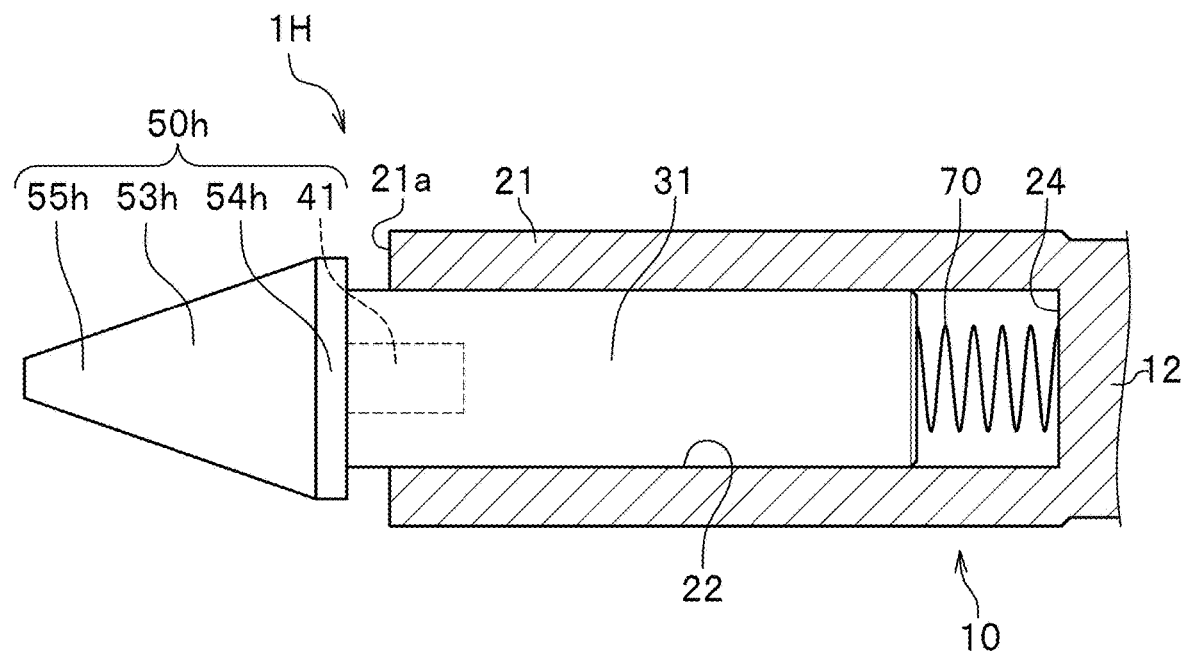
FIG. 21 is a schematic view showing a rotating tool according to a seventh embodiment of the present invention.
Figure 22:
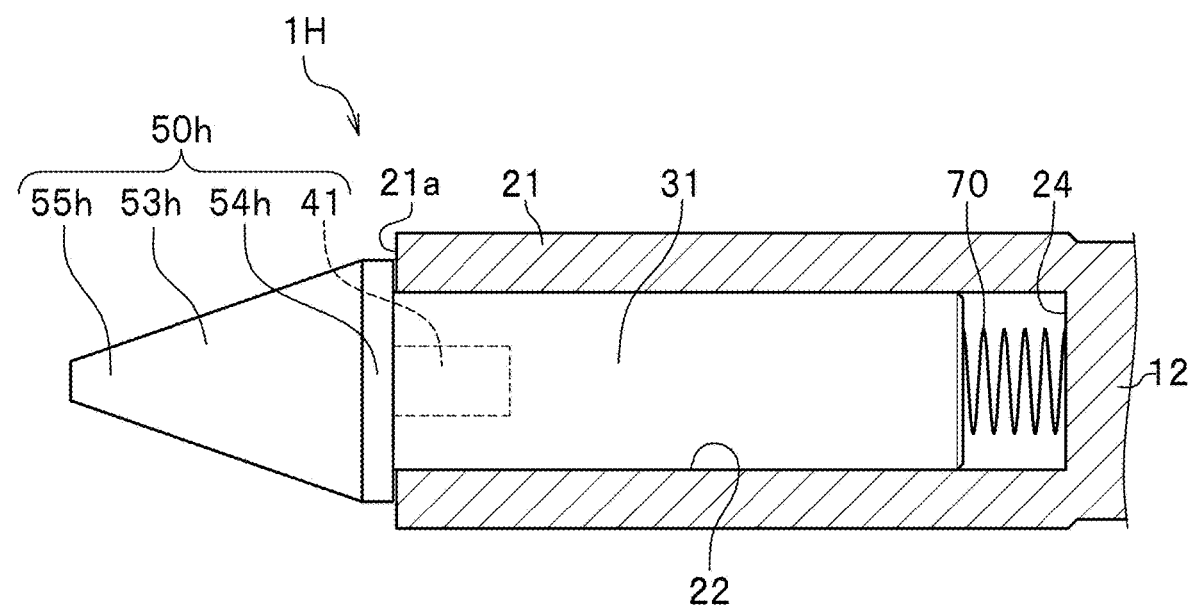
FIG. 22 is a schematic view showing a most-contracted state of the rotating tool according to the seventh embodiment.

Next, a rotating tool 1H according to a seventh embodiment is explained with reference to FIGS. 21 and 22. The rotating tool 1H according to the seventh embodiment includes the main body 10 including the holder 21 and the slide shaft 31, a stir member 50h including the coupling portion 41 and a stir pin 53h, and the elastic member 70. Since basic configurations are the same as those in the above-mentioned embodiments and modified examples, the basic configurations are denoted by the same reference numerals, and explanation thereof is omitted.

The stir member 50h according to the present embodiment is a shoulder-less stir member as in the second modified example. The outer diameter of a base end portion 54h of the stir member 50h is larger than the outer diameter of the slide shaft 31. Moreover, the outer diameter of the base end portion 54h of the stir member 50h is larger than the inner diameter of the housing recess portion 22 of the holder 21. Furthermore, a distal end portion 55h of the stir pin 53h is tapered from the base end portion 54h side toward the distal end. As shown in FIG. 22, the base end portion 54h of the stir pin 53h and the distal end portion 21a of the holder 21 come into contact with each other before the elastic member 70 reaches the maximum deflection amount, and the movement of the slide shaft 31 and the stir member 50h toward the base end side can be restricted. Specifically, in the present embodiment, the stir member 50h itself is the restriction member.

The present embodiment can also provide effects substantially the same as those in the first embodiment. In addition, according to the present embodiment, the stir member 50h functions as the restriction member, and can thereby avoid interference with the elastic member 70 housed inside the holder 21. Accordingly, for example, even when the restriction member cannot be housed inside the holder 21 together with the elastic member due to effects of the structure, shape, operation, or function of the elastic member, the stir member 50h can restrict the movement of the stir member 50h itself. Thus, the degree of freedom in design can be improved.

10. Others

Although the embodiments of the present invention have been explained above, appropriate design changes can be made within such a scope that the changes are not against the spirit of the present invention. In the above embodiments, the key grooves 23 are formed in the holder 21, and the keys 32 are formed in the slide shaft 31. However, the present invention is not limited to this configuration. The configuration may be such that the keys are formed in the holder 21, and the key grooves are formed in the slide shaft 31.

Moreover, although the elastic member 70 is housed inside the holder 21 and is arranged between the base end portion of the slide shaft 31 and the bottom portion 24 of the holder 21 on the base end side in the above embodiments, the present invention is not limited to this configuration. The elastic member 70 may be arranged at any location as long as it is a location where the elastic member 70 biases the stir member 50 toward the distal end side. Moreover, the arrangement of the restriction members may be changed depending on the arrangement of the elastic member 70. For example, the elastic member 70 may be arranged to surround a lower portion of the slide shaft. In this case, the elastic member 70 is arranged near an intermediate portion of the slide shaft 31 and the stir member 50, and acts evenly in the circumferential direction of the slide shaft 31. Accordingly, even if the slide shaft 31 moves, the elastic member 70 stably biases the stir member 50 toward the distal end side. Thus, accuracy of load control of the stir member 50 can be improved. Moreover, the configuration may be such that an extended portion extending in a columnar shape toward an upper end portion side is formed in an upper end portion of the slide shaft 31, and the elastic member 70 is fitted between the slide shaft 31 and the bottom portion 24 of the holder 21 on the base end side to surround this extended portion of the slide shaft 31. In this case, the extended portion may be formed to have a smaller diameter than the slide shaft 31 according to the inner diameter of the holder 21. The accuracy of load control of the stir member 50 can be improved also in this case.

Furthermore, in the present embodiment, the case where the restriction member 100 has the cylindrical column shape and is arranged in the hollow portion of the elastic member 70 is explained as an example. The restriction member may have a tubular shape with an inner diameter larger than the outer diameter of the elastic member 70. In this case, the configuration may be such that the elastic member 70 is arranged inside the restriction member, and the restriction member is arranged to cover the outside of the elastic member 70.

REFERENCE SIGNS LIST 1 rotating tool
2 to-be-joined members 3 joining device
10 main body
11 fixation portion
12 rotating shaft
21 holder
23 key groove
31 slide shaft
32 key
50 stir member
51 stir pin
61 shoulder
70 elastic member
100 restriction member

The invention claimed is:

1. A rotating tool used in a joining device configured to perform friction stir welding of to-be-joined members, the rotating tool comprising:
a main body including a fixation portion that is attached and fixed to the joining device and a rotating shaft that transmits rotating force from the joining device;
a stir member including a stir pin that performs friction stirring on the to-be-joined members by being inserted into the to-be-joined members, the stir member provided to be rotatable by receiving the rotating force from the rotating shaft and provided in the main body to be movable in an axial direction of the rotating shaft;
an elastic member configured to bias the stir member toward a distal end side in the axial direction of the rotating shaft; and
a restriction member configured to restrict movement of the stir member toward a base end side in the axial direction of the rotating shaft, wherein
the restriction member restricts the movement of the stir member such that an amount of deformation occurring in the elastic member with the movement of the stir member does not exceed a maximum allowable amount of the elastic member;
the main body further includes a holder that has a hollow tube shape and that is attached to the rotating shaft and a slide shaft that is housed in a center portion of the holder to be slidable in a rotating shaft direction and that rotates in synchronization with the holder,
the stir member is provided at a distal end of the slide shaft,
the slide shaft is biased toward a distal end side of the stir member via the elastic member, and
the restriction member restricts movement of the slide shaft toward the base end side in the axial direction of the rotating shaft; and
one of the following:
i) the restriction member is provided in the holder, and the movement of the slide shaft is restricted by contact of a base end portion of the slide shaft and a bottom portion of the holder on the base end side with the restriction member that occurs with the movement of the slide shaft;
ii) the restriction member is provided in a bottom portion of the holder on the base end side, and the movement of the slide shaft is restricted by contact of a base end portion of the slide shaft with the restriction member that occurs with the movement of the slide shaft;
iii) the restriction member is provided in a base end portion of the slide shaft, and the movement of the slide shaft is restricted by contact of a bottom portion of the holder on the base end side with the restriction member that occurs with the movement of the slide shaft;
iv) the restriction member is provided on an outer peripheral surface of the slide shaft, and the movement of the slide shaft is restricted by contact of the restriction member with an intermediate portion of the holder that occurs with the movement of the slide shaft;
v) the restriction member is provided on an outer peripheral surface of the slide shaft, and the movement of the slide shaft is restricted by contact of the restriction member with a distal end portion of the holder that occurs with the movement of the slide shaft;
vi) the restriction member is provided in a distal end portion of the slide shaft, and the movement of the slide shaft is restricted by contact of the restriction member with a distal end portion of the holder that occurs with the movement of the slide shaft;
vii) the stir member is the restriction member, and the movement of the slide shaft is restricted by contact of the stir member with a distal end portion of the holder that occurs with the movement of the slide shaft.

2. The rotating tool according to claim 1, wherein
the stir member further includes a shoulder with a columnar shape or a frustum shape that is coupled to the slide shaft and that has a lower end surface with a flat surface shape or, the lower end surface that is configured to come into contact with the to-be-joined members, and
the stir pin hangs down from the lower end surface of the shoulder.

3. The rotating tool according to claim 1, wherein
the stir member further includes a coupling portion that is coupled to the slide shaft and that has a columnar shape or a frustum shape, and
the stir pin hangs down from a lower end surface of the coupling portion.

4. A joining device comprising:
the rotating tool according to claim 1;
a power unit configured to output the rotating force to be transmitted to the rotating shaft of the rotating tool; and
a position controller configured to hold the fixation portion of the rotating tool and perform position control of the rotating tool, wherein
the joining device performs the friction stir welding on the to-be-joined members by causing the position controller to move the rotating tool such that the rotating tool is located at a predetermined height position relative to the to-be-joined members, and insert the stir pin into the to-be-joined members.

5. A joining device comprising:
the rotating tool according to claim 2;
a power unit configured to output the rotating force to be transmitted to the rotating shaft of the rotating tool; and
a position controller configured to hold the fixation portion of the rotating tool and perform position control of the rotating tool, wherein
the joining device performs the friction stir welding on the to-be-joined members by causing the position controller to move the rotating tool such that the rotating tool is located at a predetermined height position relative to the to-be-joined members, and insert the stir pin into the to-be-joined members.

6. A joining device comprising:
the rotating tool according to claim 3;
a power unit configured to output the rotating force to be transmitted to the rotating shaft of the rotating tool; and
a position controller configured to hold the fixation portion of the rotating tool and perform position control of the rotating tool, wherein the joining device performs the friction stir welding on the to-be-joined members by causing the position controller to move the rotating tool such that the rotating tool is located at a predetermined height position relative to the to-be-joined members, and insert the stir pin into the to-be-joined members.

7. The joining device according to claim 5, wherein the joining device performs the friction stir welding on the to-be-joined members by inserting the stir pin and the shoulder rotating together with the stir pin into the to-be-joined members.

8. The joining device according to claim 6, wherein the joining device performs the friction stir welding on the to-be-joined members by inserting only the rotating stir pin into the to-be-joined members in a state where the coupling portion is separated from the to-be-joined members.

9. A joining method comprising performing friction stir welding on the to-be-joined members by moving the rotating tool according to claim 1 such that the rotating tool is located at a predetermined height position relative to the to-be-joined members, and inserting the stir pin into the to-be-joined members.

* * * * *